(12) United States Patent
Paisal et al.

(10) Patent No.: US 9,392,626 B2
(45) Date of Patent: Jul. 12, 2016

(54) METHOD AND SYSTEM TO SUPPORT SINGLE RADIO VIDEO CALL CONTINUITY DURING HANDOVER

(75) Inventors: Vaishali Paisal, Byrasandra (IN); Rahul Suhas Vaidya, Byrasandra (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 13/508,874

(22) PCT Filed: Nov. 9, 2010

(86) PCT No.: PCT/KR2010/007875
§ 371 (c)(1),
(2), (4) Date: May 9, 2012

(87) PCT Pub. No.: WO2011/056046
PCT Pub. Date: May 12, 2011

(65) Prior Publication Data
US 2012/0224564 A1    Sep. 6, 2012

(30) Foreign Application Priority Data

Nov. 9, 2009 (IN) .......................... 2744/CHE/2009

(51) Int. Cl.
*H04Q 7/00* (2006.01)
*H04W 76/02* (2009.01)
(Continued)

(52) U.S. Cl.
CPC ............. *H04W 76/021* (2013.01); *H04N 7/148* (2013.01); *H04W 36/0027* (2013.01); *H04W 36/14* (2013.01)

(58) Field of Classification Search
CPC ..... H04N 7/147; H04N 7/148; H04W 76/021

USPC .............. 370/331, 332, 352, 401; 455/435.1, 455/436, 439, 442
See application file for complete search history.

(56) References Cited

U.S. PATENT DOCUMENTS 8,483,182 B1 * 7/2013 Keller ............... H04W 36/0027
370/331
8,665,823 B2 * 3/2014 Hwang et al. ................ 370/331
(Continued)

FOREIGN PATENT DOCUMENTS

JP    2009-526424 A    7/2009
JP    2009-528718 A    8/2009
(Continued)

OTHER PUBLICATIONS

WO2010/122029.*
(Continued)

Primary Examiner — Chuong T Ho
(74) Attorney, Agent, or Firm — Jefferson IP Law, LLP

(57) ABSTRACT

A method and system for managing a plurality of network bearers in a wireless communication network is provided. The method includes identifying at least one of an initiation or an update of an instance of an application session. The method then generates an identifier associated with said instance of the application session. Further, the method assigns said identifier to each of the plurality of network bearers established as a result of said identified initiation or identified update of said instance of the application session. In an embodiment, the method uses the said identifier for managing communication during handover from a first communications network to a second communications. The method manages both video bearers and the voice bearers during the handover based on the said identifier.

20 Claims, 7 Drawing Sheets

(51) Int. Cl.
*H04N 7/14* (2006.01)
*H04W 36/00* (2009.01)
*H04W 36/14* (2009.01)

(56) References Cited

U.S. PATENT DOCUMENTS

| | | | |
|---|---|---|---|
| 8,675,607 B2* | 3/2014 | Stenfelt | H04W 36/0022 370/331 |
| 9,078,172 B2* | 7/2015 | Lindholm | H04W 36/0022 |
| 9,119,116 B2* | 8/2015 | Andre-Jonsson | H04W 36/0022 |
| 2009/0052384 A1 | 2/2009 | Zisimopoulous et al. | |
| 2009/0181685 A1 | 7/2009 | Ekstrom et al. | |
| 2009/0268635 A1 | 10/2009 | Gallagher et al. | |
| 2009/0270099 A1* | 10/2009 | Gallagher et al. | 455/435.1 |
| 2009/0304015 A1 | 12/2009 | Willars et al. | |
| 2010/0017846 A1 | 1/2010 | Huang et al. | |
| 2010/0039936 A1* | 2/2010 | Jin et al. | 370/230 |
| 2010/0040020 A1* | 2/2010 | Chen | 370/331 |
| 2010/0067400 A1* | 3/2010 | Dolganow et al. | 370/253 |
| 2010/0130207 A1* | 5/2010 | Wu | 455/436 |
| 2010/0290433 A1 | 11/2010 | Stojanovski et al. | |
| 2010/0296484 A1* | 11/2010 | Wu | 370/331 |
| 2010/0329243 A1* | 12/2010 | Buckley | H04W 48/18 370/352 |
| 2010/0329244 A1* | 12/2010 | Buckley | H04W 76/026 370/352 |
| 2011/0013597 A1* | 1/2011 | Hwang et al. | 370/331 |
| 2011/0280217 A1* | 11/2011 | Drevon et al. | 370/331 |
| 2012/0039303 A1* | 2/2012 | Stenfelt et al. | 370/331 |
| 2012/0212569 A1 | 8/2012 | Lei | |
| 2012/0224564 A1 | 9/2012 | Paisal et al. | |
| 2013/0250032 A1* | 9/2013 | Andre-Jonsson | H04W 36/0022 348/14.02 |

FOREIGN PATENT DOCUMENTS

| | | |
|---|---|---|
| JP | 2010-517387 A | 5/2010 |
| JP | 2011-514025 A | 4/2011 |
| JP | 2013-509745 A | 3/2013 |
| JP | 2013-510535 A | 3/2013 |
| WO | 2008-116363 A1 | 10/2008 |
| WO | 2009/024501 A1 | 2/2009 |
| WO | 2009/089987 A1 | 7/2009 |
| WO | WO2010122029 * | 10/2010 |

OTHER PUBLICATIONS

U.S. Appl. No. 61/171,918, filed Apr. 23, 2009.*
U.S. appl. No. 61/198,865, filed Nov. 10, 2008.*
U.S. Appl. No. 61/198,865, filed Nov.10, 2008.*
U.SA. Appl. No. 61/221,502, filed Jun. 29, 2009.*
3GPP TS 23.216 V9.10 (Sep. 2009).*
U.S. Appl. No. 61/171,918, filed Apr. 2009.*
3GPP TS 23.216 v8.2.0, 3rd Generation Partnership Project; Technical Specification Group Services and System Aspects; Single Radio Voice Call Continuity(SRVCC); Stage 2(Release 8), Dec. 2008.
Martin Sauter, "Voice over LTE via Generic Access (VoLGA)", A Whitepaper, Aug. 2009, extracted from http://www.wirelessmoves.com.
LG Electronics, "WID for IMS Service Continuity Enhancements: Service, Policy and Interactions", 3GPP TSG SA WG2 Meeting #67, Aug. 25-29, 2008, Sophia Antipolis, France.
Samsung Electronics, "SRVCC=Single Radio Video Call Continuity", SA2#76, Nov. 10, 2009, San Jose del Cabo.

* cited by examiner

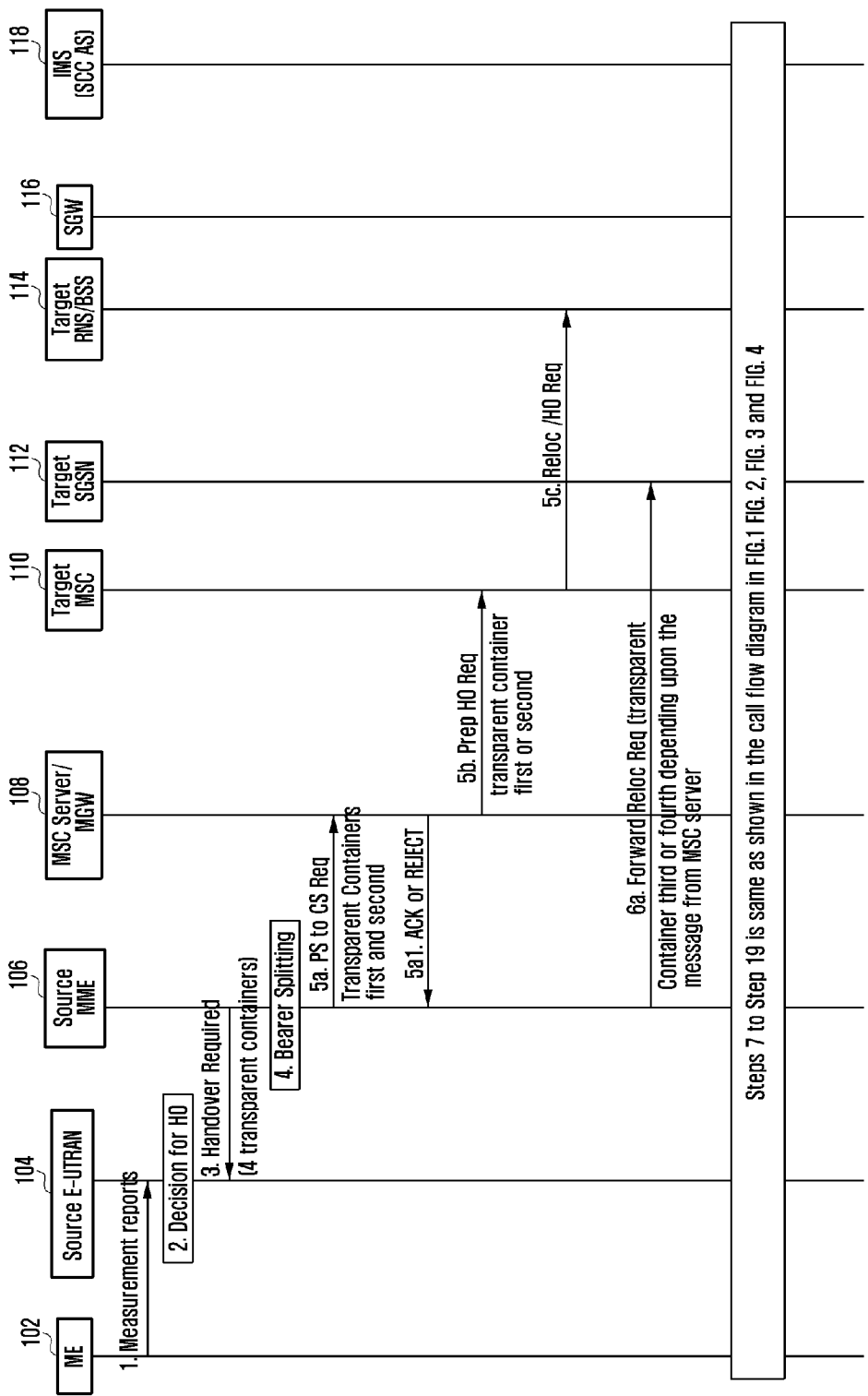

METHOD AND SYSTEM TO SUPPORT SINGLE RADIO VIDEO CALL CONTINUITY DURING HANDOVER

TECHNICAL FIELD

The present invention, in general, relates to field of mobile communication technology and more specifically to a field of handover from a first communication network to a second communication network.

BACKGROUND ART

Today, several generations of radio communication systems have evolved in the world. The several generations of the radio communication systems includes first generation system (1G), second generation system (2G), third generation system (3G) and fourth generation system (4G). Each of the generations has different transmission characteristics and different communication technology.

The fourth generation system (4G) is an ITU specification that is presently being developed for broadband mobile capabilities. The 4G system would enable Internet Packet (IP)-based voice data and streaming multimedia at higher speeds, compared to 3G. The radio communication system is also termed as Radio Access Networks (RAN). As the number of RANs is increasing, the geographical areas are also covered by one or more RANs. For example, at a given geographical area there may be two RANs that operate simultaneously, for example 2G and 3G systems. Similarly, there may be a geographical area where only one RAN is operating, for example only 3G.

Thus with an increase in the number of RANs, for example GSM, UMTS, Wireless Local Area Network (WLAN), and EDGE, interworking between different RANs and air interface standards has become a priority. Hence, to achieve efficient interworking between different RANs and to provide more network coverage to User Equipment (UE), handover procedures between RANs and communication network has become increasingly important. The Handover (HO) procedure is a technical procedure for switching an in-progress call from a coverage area of one base station (or one communication systems) to another base station (or another communication system) while ensuring the continuity of the in-progress call.

The HO in a communication system is when the UE moves from one radio cell supported by the communication system to another radio cell supported by the communication system. For example in 2G, moving from coverage area of one base station associated with one service provider to another base station supported by the same or different service providers. The HO between different RANs means an inter-technology handover, for example moving from a 3G network to a 4G network, and vice-versa. The HO between different RANs is known as inter Radio Access Technology HO.

The different RANs have different characteristics and have different network structures that enable communication services for the UE. Hence, the HO procedures from one RAN to another RAN have to be managed efficiently. For example, voice bearers and non voice bearers that are associated with the UE in a first RAN can be supported through Packet Switched network and/or Circuit Switched network. Further, when the UE moves from the first RAN to a second RAN and HO procedure is initiated, and then there may be a case that the second RAN has different capabilities than the first RAN. Then the voice bearers and non-voice bearers associated with the UE have to be managed efficiently based on the capabilities of the second RAN.

Currently, Single Radio Voice Call Continuity (SRVCC), as described in Technical Specification (TS) 23.216[2], is used to support only voice calls of a user. However, there may be a scenario where the user also wants to send video/multimedia data using SRVCC. Today, there is a plurality of applications that are running on a communication device and each applications is associated with at least one bearer. However, from the plurality of applications there may be certain applications which have more than one dedicated bearers for particular media streams like video call application which includes both voice and video bearers. Hence, it may be required by network nodes to recognize which media flows belong to a particular application for scenarios like handover decisions, selective bearer deactivation during load balancing and the like.

Hence there exist need to support Single Radio Video Call Continuity in a communication.

DISCLOSURE OF INVENTION

Technical Problem

The present invention is designed to address at least the above-mentioned problems and/or disadvantages and to provide at least the advantages described below. Accordingly, an aspect of the present invention is to provide a method and apparatus for managing a plurality of network bearers in a wireless communication network.

Solution to Problem

In accordance with an aspect of the present invention, a method for managing a plurality of network bearers in a wireless communication network is provided. The method includes identifying at least one of an initiation or an update of an instance of an application session. The method then generates an identifier associated with said instance of the application session. Further, the method assigns said identifier to each of the plurality of network bearers established as a result of said identified initiation or identified update of said instance of the application session.

In accordance with another aspect of the present invention, a method for managing communication during handover from a first communications network to a second communications network is provided. The method includes receiving a handover from a PS network to a CS network indication. The method then identifies a plurality of network bearers corresponding to a video call application instance based on a quality of service identifiers, wherein the plurality of network bearers is corresponding to voice bearer and video bearer belonging to an application instance. Thereafter, the method sends the video SRVCC capabilities to one or more Network Element (NE).

In accordance with yet another embodiment of the present invention, a method for managing communication during handover from a first communications network to a second communications network. The method includes identifying the capabilities of the ME for performing handover. The method then sends the capabilities to a NE for performing handover.

In accordance with still another embodiment of the present invention, a method for managing communication during handover from a first communication network to a second communication network is provided. The method at a Network Element (NE) includes identifying a Mobile Entity (ME) video handover capability from PS to CS networks. The method then identifies an instance of an application session corresponding to a video call session. Thereafter, the method performs a video handover from a PS to a CS network using at least one of a ME video SRVCC capability and an identifier for performing video from a PS to a CS network, wherein the identifier is assigned to each of a plurality of network bearers associated with said application session that are subject to handover.

In accordance with still another embodiment of the present invention a system for managing a plurality of network bearers in a wireless communication network is provided. The system includes a means for identifying at least one of an initiation or an update of an instance of an application session, a means for generating an identifier of said instance of the application session, and means for assigning said identifier to each of the plurality of network bearers established as a result of said identified initiation or identified update of said instance of the application session.

In accordance with still another embodiment of the present invention a system for managing communication during handover from a first communications network to a second communications network. The system includes a means for receiving a handover from a PS network to a CS network indication, a means for identifying a plurality of network bearers corresponding to a video call application based on a quality of service identifiers, wherein the plurality of network bearers is corresponding to voice bearer and video bearer belonging to an application instance, and a means for sending the video SRVCC capabilities to one or more Network Element (NE).

In accordance with still another embodiment of the present invention A Mobile Entity (ME) is provided. The ME includes a processor and a transceiver. The processor is to identify video Single Radio Voice Call Continuity (SRVCC) capabilities of the ME. The transceiver sends the video Single Radio Voice Call Continuity capabilities of the ME to a Network Element (NE).

In accordance with still another embodiment of the present invention, a Network Element (NE) is provided. The NE includes a processor and a transceiver. The processor is capable of identifying a Mobile Entity (ME) video handover capability, from PS to CS networks. The processor also identifies an instance of an application session corresponding to a video call session. The transceiver is capable of performing a video handover from a PS to a CS network using at least one of a ME video SRVCC capability and an identifier for performing video from a PS to a CS network, wherein the identifier is assigned to each of a plurality of network bearers associated with said application session that are subject to handover.

BRIEF DESCRIPTION OF DRAWINGS

The above and other aspects, features, and advantages of certain embodiments of the present invention will be more apparent from the following description taken in conjunction with the accompanying drawings, in which:

FIG. 7 illustrates a flow diagram depicting a method to support video call application during Handover, in accordance with yet another embodiment of the present invention.

Figure 1:
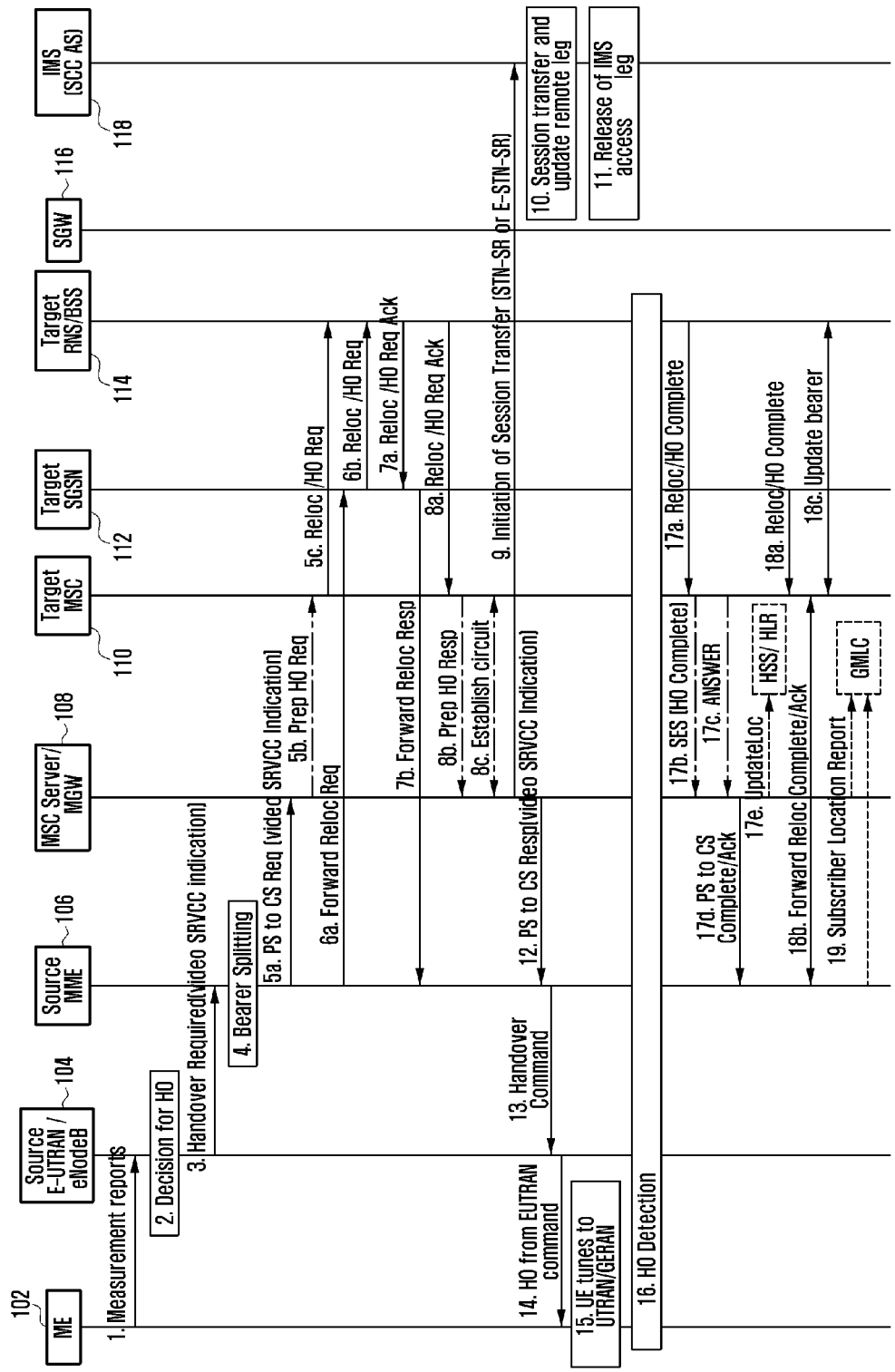
FIG. 1 illustrates a flow diagram depicting a method to support video call application during handover when a single bearer is established for carrying both voice and video, in accordance with an embodiment of the present invention.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various embodiments of the present disclosure.

Throughout the drawings, it should be noted that like reference numbers are used to depict the same or similar elements, features, and structures.

MODE FOR THE INVENTION

The following description, with reference to the accompanying drawings, is provided to assist in a comprehensive understanding of certain embodiments of the present invention as will be defined by the claims and their equivalents. Although the description includes various specific details to assist in that understanding, these are to be regarded as merely exemplary. Accordingly, those of ordinary skill in the art will recognize that various changes and modifications of the embodiments described herein can be made without departing from the scope and spirit of the present invention. In addition, descriptions of well-known functions and constructions are omitted for clarity and conciseness.

The terms and words used in the following description and claims are not limited to the dictionary meanings, but are merely used by the inventor to enable a clear and consistent understanding of the present invention.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 7, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 illustrates a flow diagram depicting a method to support video call application during handover when a single bearer is established for carrying both voice and video, in an embodiment of the present invention.

In the method, a first Network Element (NE) in the communication network sends a handover request to a second NE when the measurement report is received from the Mobile equipment. In an embodiment, the handover is an video SRVCC handover. In an embodiment, the first NE is an eNodeB and the second NE is a Mobility Management Entity (MME) or a Serving GPRS Support Node (SGSN).

The second NE will perform bearer splitting and sends the handover request to a third NE. In an embodiment, the third NE is a Mobile Switching Center (MSC) server. Further, the third NE will prepare a target system for the handover and sends back a Handover response to the second NE. The second NE then sends the handover command to the ME which then moves to the target system. The detailed method with reference to the specific network elements is further explained below.

In the method, an eNodeB and an MME use QCI and/or ARP value to identify a video call related bearer. The eNodeB triggers video SRVCC operation based on video SRVCC operation possible indication from the MME and the presence of Quality of Service Class Identifer QCI corresponding to bearer carrying both voice and video. The 'SRVCC Operation Possible' implicitly indicates a UE's video SRVCC capability to the eNodeB, The UE indicates its video SRVCC capability to the MME during the Attach/TAU procedures. The MME then splits the bearers based on SRVCC HO indication for video call, QCI and/or ARP value. The MME then sends PS to CS message to a Mobile Switching Center (MSC) server along with SRVCC for video call indication. The MSC server offers Session Data Protocol (SDP) for voice and video bearers and sends an invite to an application server. The detailed flow of the message in the method is explained below.

Referring to FIG. 1, at step 1 a User Equipment (UE) 102 sends measurement reports to source E-UTRAN 104 (or eNodeB in the E-UTRAN) for initiating HandOver (HO). At step 2, the eNodeB 104 identifies whether an SRVCC operation should be triggered for voice and/or for video based on the Quality of Service (QoS) Class Identifier (QCI) and/or Allocation and Retention Priority (ARP) value associated with bearers and the possibility of SRVCC operation at the MME.

At step 3, the eNodeB 104 prepares a transparent container indicating that a video bearer (for which QCI value is '2') as well as a voice bearer (for which QCI value is '1') should be transferred to a CS side. The information for preparing transparent container is included in Technical Specification (TS) 25.413[4] (TS 25.413[4]) and TS 36.413[3] for UTRAN and E-UTRAN respectively. The HO required message also includes an indication that the SRVCC operation should be triggered for video call as shown in Table 1 in Appendix. Further, in case of High Speed Packet Access (HSPA) network an indication shall be carried in Relocation Required message as shown in Table 2.

At step 4, an MME 106 performs a split based on the presence of SRVCC for video indication received from eNodeB, QCI value and/or ARP value associated with the bearers. At step 5a, the MME 106 sends an indication to a MSC server 108 in a PS to CS request to offer video as well as voice data. The PS to CS request message is shown in Table 3 in the Appendix.

At step 5b, a MSC server 108 sends a reject if it receives an indication to prepare a video SDP from the MME 106 and the MSC server 108 cannot support video calls. This reject message can be sent independently or as a part of PS to CS response explained in step 12. At step 5c, a target MSC 110 requests resource allocation for a CS relocation by sending the Relocation Request/Handover Request (additional source to target transparent container) message to a target RNS/BSS 114.

At step 6a, the source MME 106 forwards relocation request to a target Serving GPRS Support Node (SGSN) 112. Thereafter, at step 6b the target SGSN sends the HO request to the target RNS/BSS 114. Further, the PS-to-CS indicator will also be set for video bearers also. At step 7a, an acknowledgement is also received from the target RNS/BSS 114. Hence, after the target RNS/BSS 114 receives both the CS relocation/HO request with the PS relocation/HO request, it assigns the appropriate CS resources and PS resources. At step 7a the target RNS/BSS acknowledges a prepared PS re-location/HO by sending a Relocation Request Acknowledge/HO request acknowledge (Target to Source Transparent Container) message to the target SGSN 112. At step 7b, the target SGSN 112 sends a Forward Relocation Response (Target to Source Transparent Container) message to the source MME 106.

Further, step 8 is performed in parallel to the previous step. At step 8a, the target RNS/BSS 114 acknowledges the prepared CS relocation/HO by sending the Relocation Request Acknowledge/Handover Request Acknowledge (Target to Source Transparent Container) message to the target MSC. At step 8b, the target MSC 110 sends a Prepare Handover Response (Target to Source Transparent Container) message to the MSC Server 108. At step 8c, circuit connection between the target MSC 110 and the MGW associated with the MSC Server 108 is established.

The relocation HO request acknowledgment is sent at step 7a and at step 8a. At step 9, the MSC server 108 receives the indication from the MME 106 to prepare video SDP also, it prepares video SDP along with voice SDP otherwise it offers SDP for voice only.

At step 10, during the execution of the session transfer procedure the remote end is updated with the SDP of the CS access leg according to TS 23.237 [9]. The downlink flow of Voice over Internet Protocol (VoIP) packets is switched towards the CS access leg at this point. At step 11, the source IMS 118 access leg is released according to TS 23.237[9]. At step 12, the MSC server 108 also includes an indication whether it prepared the SDP for video besides voice. Hence, if the MME 106 at step 5a has requested a voice/video operation but it is not supported by the MSC server 108, then MSC server 108 sends back a response indicating that SRVCC operation cannot be performed for video and continues with the SRVCC operation for voice only.

At step 13, the source MME 106 synchronizes the two prepared relocations and sends a HO Command (Target to Source Transparent Container) message to the source E-UTRAN 104. At step 14, the E UTRAN 104 sends a HO message from E-UTRAN Command message to the UE 102. The UE 102, at step 15 tunes to the target UTRAN/GERAN cell. At step 16, HO detection at a target RNS/B SS 114 occurs. Thereafter, the UE 102 sends a HO complete message via the target RNS/BSS 114 to the target MSC 110. If the target MSC 110 is not the MSC Server 108, then the target MSC 110 sends an SES (HO Complete) message to the MSC Server 108. At step 17a, the target RNS/BSS 114 sends a relocation HO complete message to the target MSC 110. At step 17b and 17c, the target MSC 110 will send the HO complete message to the MSC server. At step 17*d*, the MSC server 108 will send the PS to CS acknowledgment shared with the source MME 106. At step 17*e*, the MSC server will update the Home Location Register (HLR).

At step 18*a*, the target RNS/BSS 114 will send the relocation HO complete message to the target SGSN 112, thereafter the target SGSN 112 will send the acknowledgment to the source MME 106. At step 18*c*, the target SGSN 112 will communicate with Serving Gateway SGW 116 and the bearers are updated. At step 19, location continuity is managed where the MSC server 108 and the source MME 106 send subscriber location report to the Gateway Mobile Location Center GMLC.

Figure 2:
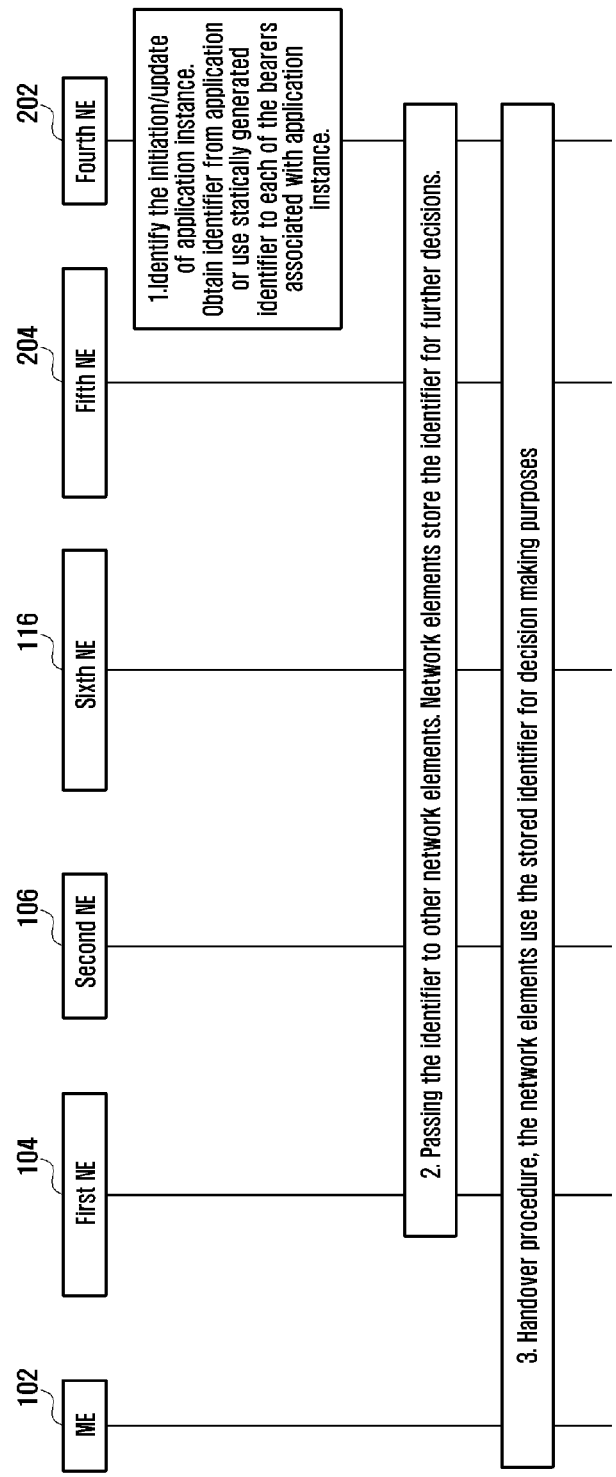
FIG. 2 illustrates a flow diagram for managing a plurality of network bearers in a wireless communication network, in accordance with an embodiment of the present invention.

FIG. 2 illustrates a flow diagram for managing a plurality of network bearers in a wireless communication network, in accordance with an embodiment of the present invention.

In the method, at step 1 a fourth NE 202 identifies the initiation or an update of application instance. In an embodiment, the fourth NE is a PCRF entity. The fourth NE further obtains identifier from an application instance or use statically generated identifier to each of the bearers associated with application instance. At step 2, the fourth NE exchange messages with the one or more NEs. For example, the first NE, the second NE, the fifth NE and the sixth NE. In an embodiment, the first NE is an eNodeB. In an embodiment, the second NEs MME/SGSN. In an embodiment, the fifth NE is a PGW. In an embodiment, the sixth NE is a SGW.

In the message exchanges, the fourth NE will pass the generated identifier with the one or more NEs. Thereafter, the one or more NEs will store the identifier for further decisions. In an embodiment, the decisions is a handover decision. At step 3, the one or more NEs use the stored identifier for decision making purposes for example handover decisions.

Figure 3:
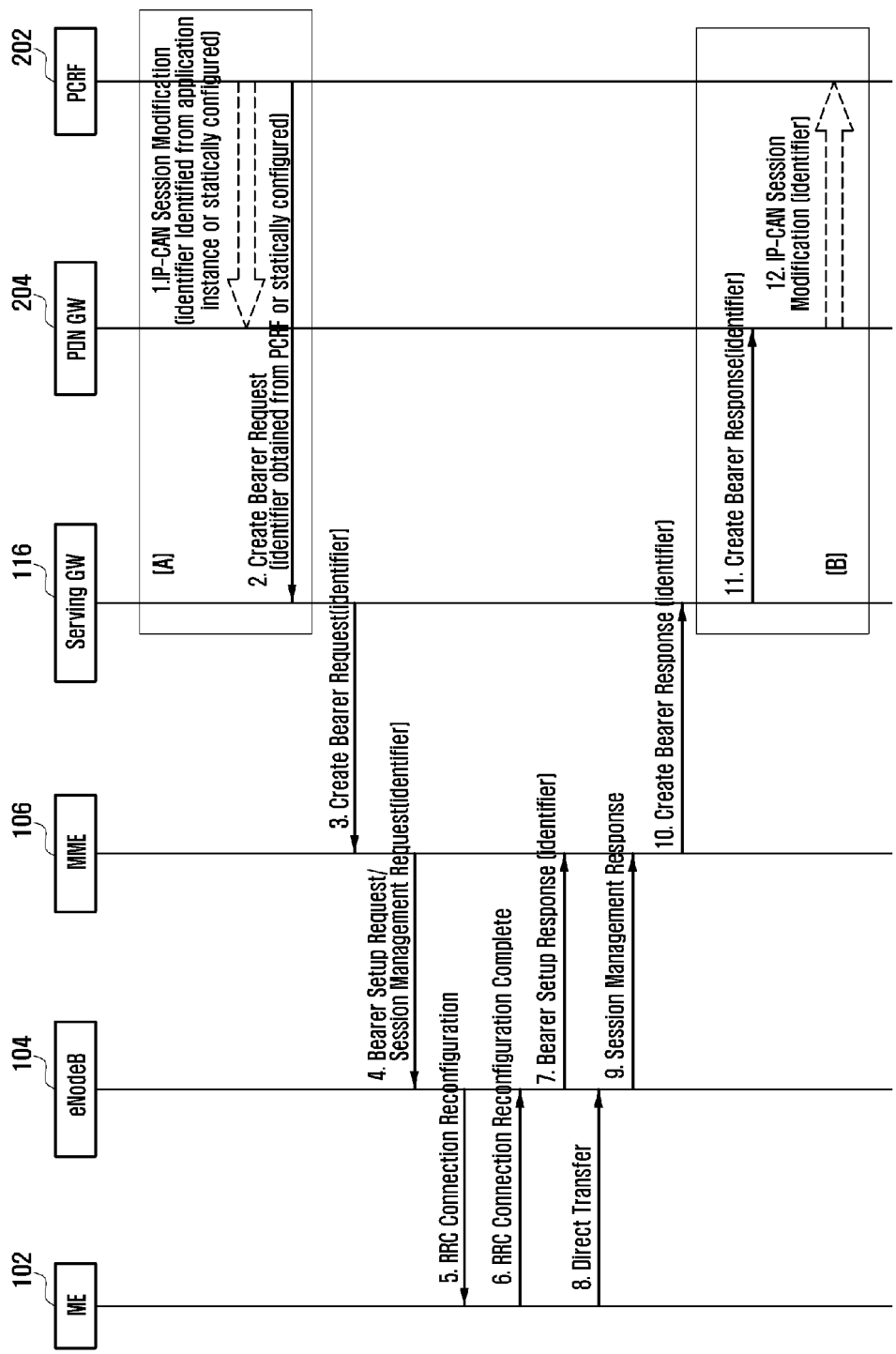
FIG. 3 illustrates a flow diagram depicting a method to support video call application based on generated identifier, in accordance with an embodiment of the present invention.

FIG. 3 illustrates a flow diagram depicting a method to support video call application based on generated identifier, in accordance with an embodiment of the present invention.

The method manages a plurality of network bearers in a wireless communication network. In an embodiment, the wireless communication network is an E-UTRAN communication network or an UMTS communication network. In an embodiment, the identifier uniquely identifies each of the plurality of bearers with the instance of the application session. In an embodiment, identifying each of the plurality of bearers corresponding to an initiation or an update of application session, wherein the plurality of bearers is transporting at least one of voice, video, and text data. In an embodiment, the means for initiation or an update of the application session is a processing unit.

The method then generates an identifier associated with said instance of the application session. In an embodiment, the said identifier is at least one of an application identifier or a correlation identifier. In an embodiment, the identifier is generated by a fourth NE. In an embodiment, fourth NE is a Policy and Charging Rules Function (PCRF) entity. In an embodiment, an identifier associated with said instance of the application session can be generated by the processing unit. The method further assigns the identifier to each of the plurality of network bearers established as a result of said identified initiation or identified update of said instance of the application session. In an embodiment, means for assigning the identifier is the processing unit.

In an embodiment, the method sends the identifier to a fifth NE. In an embodiment, the fifth NE is a Packet Data Network (PDN) Gateway. The method then sends said identifier from the fifth NE to a sixth NE. In an embodiment, the sixth NE is a Serving Gateway (SGW). Thereafter, the method sends the identifier from the sixth NE to the second NE (mentioned in FIG. 1).

In an embodiment, the identifier is generated by the fifth NE (PGW). In the embodiment, the method sends the identifier from the fifth NE to the sixth NE (SGW) and thereafter sends the identifier is sent to the second NE (MME). In an embodiment, the initiation of said instance of the application session involves a Mobile Entity (ME). In the embodiment, the video SRVCC capabilities of the ME is identified. Further, generating and assigning steps are carried out only when the ME has video SRVCC capabilities. The method then sends the identifier to the first NE (eNodeB) at least when the ME is video SRVCC capable. The detailed method with reference to the specific network elements is further explained below.

This method is applied when different bearers are established for voice and video streams corresponding to video call application. In the method, a Policy and Charging Rules Function (PCRF) provides the Identifier to Policy and Charging Enforcement Function (PCEF), for example Packet Data Network Gateway (PGW) when dynamic Policy and Charging Control (PCC) is deployed. This Identifier can be the actual Identifier identified from application instance or a statically configured Identifier at the PCRF. Further, the PCEF uses statically assigned Identifier when dynamic PCC is not deployed. The PCEF sends this Identifier to a Serving Gateway (SGW) in Create Bearer Request message.

The SGW further sends this ID to an MME in Create Bearer Request message along with EPS bearer identity and linked bearer identity. The MME then decides whether to send the same Identifier to eNodeB along with EPS bearer identity in Bearer Setup Request message based on UE video SRVCC capability. The UE indicates its video SRVCC capability as a part of 'UE Network Capability' in the 'Attach Request' and 'TAU Request' messages. For GERAN/UTRAN it is included as part of "MS Network Capability". The mechanism avoids triggering video SRVCC HO by the eNodeB from UEs if it does not support video. The PGW, SGW, MME and eNodeB will then store this information locally for further decisions. The detailed flow of the messages in the method is explained below.

Referring to FIG. 3, at step 1*a* PCRF 202 sends the Identifier to PDN Gateway (GW) 204 in case of dynamic PCC. The PCRF can send a Identifier obtained from application instance or a statically assigned Identifier. In case dynamic PCC is not deployed PDN GW 204 uses a statically configured Identifier as mentioned in step 2. At step 2, the PDN GW 204 sends the Identifier to Serving Gateway SGW 116 along with EPS bearer identity and linked bearer identity. The PDN GW 204 stores the Identifier in the bearer context as shown in Table 4 in Appendix.

At step 3, the SGW 116 sends a Identifier to the MME 106 along with EPS bearer identity and linked bearer identity in Create Bearer Request message as shown in Table 5. The SGW 116 stores the Identifier in the bearer context as shown in Table 6. At step 4, the MME 106 decides based on the conditions (for example UEs video SRVCC capability) whether to send the Identifier to the eNodeB 104.

The UE 102 indicates its video SRVCC capability as a part of the 'UE Network Capability' in the 'Attach Request' and 'TAU Request' messages during the Attach and TAU procedures respectively. For GERAN/UTRAN, it is included as part of "MS Network Capability" if the UE 102 supports video SRVCC and in addition to this step the MME 106 signals the Identifier received at step 3 in Bearer Setup Request message to the eNodeB as shown in Table 7 in the Appendix. The MME 106 stores the Identifier in the bearer context as shown in Table 8 in the Appendix.

At step 5, the eNodeB 104 stores the identifier received at the step 4. At step 6, the UE 102 acknowledges the radio bearer activation to the eNodeB 104 with a RRC Connection Reconfiguration Complete message. At step 7, the eNodeB 104 acknowledges the bearer activation to the MME 106 with a Bearer Setup Response message and includes the Identifier. At step 8, the UE 102 using NAS layer builds a Session Management Response including EPS bearer identity. The UE 102 then sends a Direct Transfer (Session Management Response) message to the eNodeB 104. At step 9, the eNodeB 104 sends an uplink NAS transport (Session Management Response) message to the MME 106 and identifier is contained in the E-RAB E-UTRAN Radio Access Bearer setup response as shown in Table 9.

At step 10, the MME 106 acknowledges the bearer activation to the ServingGW (SGW) 116 by sending a Create Bearer Response which includes the identifier as shown in Table 10 in the Appendix, upon reception of the Bearer Setup Response message at step 7 and the Session Management Response message in step 9.

At step 11, the SGW 116 acknowledges the bearer activation to a PDN GW 204 by sending a Create Bearer Response message. At step 12, the PDN GW 204 sends IP-CAN session modification message (identifier) to the PCRF 202, if the dedicated bearer activation procedure was triggered by a PCC Decision Provision message from the PCRF 202.

Figure 4:
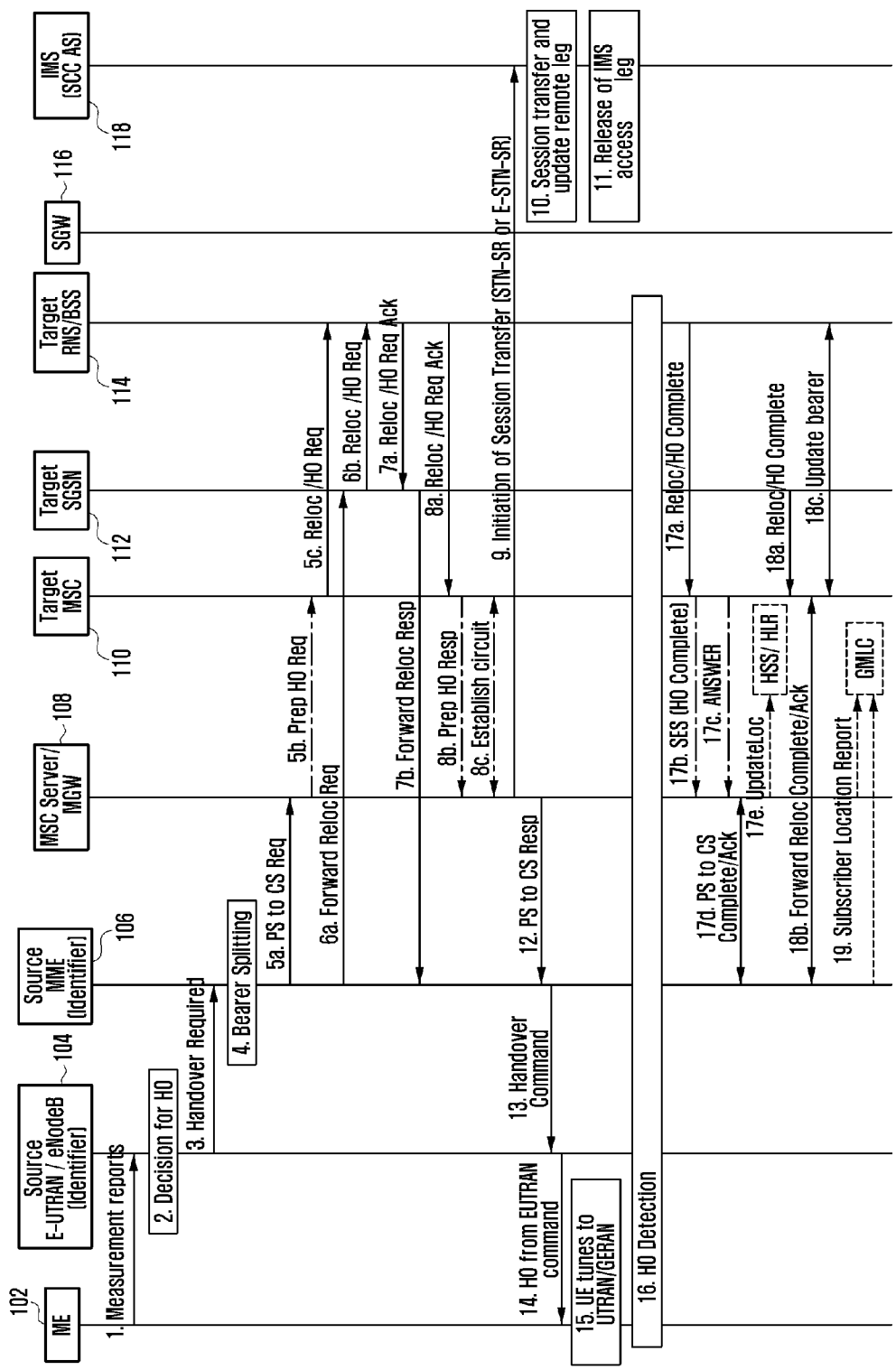
FIG. 4 illustrates a flow diagram depicting a method to support video call application during handover, in accordance with an embodiment of the present invention.

FIG. 4 illustrates a flow diagram depicting a method to support video call application during handover, in accordance with an embodiment of the present invention.

The method initially manages a plurality of network bearers in a wireless communication network. The method first identifies at least one of an initiation or an update of an instance of an application session. Thereafter, the method generates an identifier associated with said instance of the application session. Then the method assigns said identifier to each of the plurality of network bearers established as a result of said identified initiation or identified update of said instance of the application session.

In an embodiment, the method identifies capabilities of the ME for performing handover from a first communication network to a second communication network. In an embodiment, the first communications network is a Long Term Evolution network or a High Speed Packet Data network and the second communications network is a Universal Terrestrial Radio Access Network (UTRAN) or a GPRS EDGE Radio Access communication network.

In an embodiment, the method is performed by a processor in the ME. The method then sends the capabilities to a NE for performing handover. In an embodiment, the capabilities of the ME are sent to the NE by a transceiver of the ME. In an embodiment, the ME can turn on or turn off the video SRVCC capability during communication.

In an embodiment, the ME sends its video SRVCC capability to the second NE (MME/SGSN) in an Information Element (IE) in Non-Access Stratum (NAS) protocol. In an embodiment, the IE is a Mobile Station (MS) Network capabilities IE as shown in Table 12. In another embodiment, the IE is a User Equipment (UE) network capabilities IE as shown in Table 13. Although, only two types of IEs are mentioned in the description above, it does not restrict the invention to only the two types. However, a person skilled in the art can use any other type of IEs in the standard or a new type IE not known in standard as shown in Table 14.

In an embodiment, the capabilities of the ME are identified by the first NE and second NE. In the embodiment, the method identifies an instance of an application session corresponding to a video call session. In an embodiment, the capability of the ME and the instance of the application session is identified by the processor of the first NE or the second NE.

Hence, the method performs a video handover from a PS to a CS network using at least one of a ME video SRVCC capability and an identifier for performing video from a PS to a CS network, wherein the identifier is assigned to each of a plurality of network bearers associated with said application session that are subject to handover. In an embodiment, the handover is performed by the transceiver of the first NE or the second NE.

In an embodiment, the method sends a video SRVCC handover indication to the second NE (MME/SGSN) in a Handover Required message or a Relocation Required message. The method then performs bearer splitting based on the received video handover indication. In an embodiment, the bearer splitting is performed at the second NE (MME/SGSN). The method also sends the video SRVCC handover indication to the third NE (MSC server) in a Packet Switched (PS) to Circuit Switched (CS) Request message.

In an embodiment, a Session Data Protocol (SDP) is prepared by the third NE (MSC server) based on the video SRVCC handover indication and informing the second NE regarding SRVCC operation that has been performed in the PS to CS Response message. The detailed method with reference to the specific network elements is further explained below.

In the method, the eNodeB 104 and the MME 106 receive a identifier from PCRF/PGW as a part of dedicated bearer activation or as a UE initiated bearer activation process. Further, in the method the eNodeB 104 triggers SRVCC for video call operation based on 'SRVCC operation possible' implicitly indicating the UE video SRVCC capability, QCI values of voice bearer and QCI values of video bearer (for example QCI with value '1' and QCI with value '2' respectively) and the said identifier.

The MME 106 splits the bearers based on video SRVCC HO indication, QCI values and the identifier. The MME 106 then sends PS to CS message to the MSC server 108 along with SRVCC for video call indication. The MSC server 108 offers SDP for voice and video and sends an invite to an application server. The method is further explained with the help of a flow diagram.

Referring to FIG. 4, the eNodeB 104 and the MME 106 identify the identifier during a dedicated bearer activation procedure for video telephony application. At step 1, the UE 102 sends measurement reports to the E-UTRAN/eNodeB 104. The E-UTRAN 104 considers QCI values for voice and video as separate identity for example QCI with value '1' for voice and QCI with value '2' for video and the respective Identifier and triggers SRVCC Handover for video.

At step 3, the eNodeB 104 sends an SRVCC HO Indication for video instead of voice as shown in Table 1 for LTE and Table 2 for HSPA. At step 4, the source MME 106 splits the voice and video bearer belonging to video telephony application from all other PS bearers and initiates their relocation towards the MSC Server 108 and the SGSN 112 respectively. The decision is based on the QCI associated with the voice and video bearer, SRVCC HO Indication for video and the Identifier. At step 5*a*, the MME 106 includes an indication that the PS to CS request is for SRVCC video telephony application as shown in Table 3.

At step 5*b*, the MSC server 108 sends a reject when the MSC server 108 receives an indication to prepare the video SDP from the MME 106 and the MSC server 108 cannot support video. This reject can be sent independently or it can be sent as a part of PS to CS response message mentioned at step 12. At step 5c, the target MSC 110 requests resource allocation for the CS relocation by sending a Relocation Request/Handover Request (additional Source to Target Transparent Container) message to the target RNS/BSS 114. At step 6a, a relocation/HO request is forwarded to the target SGSN 112 and thereafter the same request is sent to the target RNS/BSS 114. Thereafter, an acknowledgedment is received at the target SGSN 112 from the target RNS/BSS 114.

At step 7, the RNS/BSS 114 assigns an appropriate CS and PS resources when the target RNS/BSS 114 receives both the CS relocation/handover request with the PS re-location/handover request. Thus, at step 7a the target RNS/BSS 114 acknowledges a prepared PS relocation/handover by sending the Relocation Request Acknowledge/Handover Request Acknowledge (Target to Source Transparent Container) message to the target SGSN 112. At step 7b the target SGSN 112 sends a Forward Relocation Response (Target to Source Transparent Container) message to the source MME 106.

In parallel to the previous step step 8 is also performed. At step 8a, the target RNS/BSS 114 acknowledges a prepared CS relocation/handover by sending the Relocation Request Acknowledge/Handover Request Acknowledge (Target to Source Transparent Container) message to the target MSC 110. At step 8b the target MSC 110 sends a prepared Handover Response (Target to Source Transparent Container) message to the MSC Server 108. At step 8c, a circuit connection is established between the target MSC 110 and the Mobile Gateway (MGW) associated with the MSC Server 108.

At step 9, the MSC server 108 offers SDP based on the indication from the MME 106. Thus, it offers SDP for voice only if the indication is for SRVCC for voice only. However, if the indication is for SRVCC for video then the MSC server 108 prepares SDP for voice and video both. At step 10, during the execution of the session transfer procedure the remote end is updated with the SDP of the CS access leg according to the TS 23.237 [9]. The downlink flow of VoIP packets is also switched towards the CS access leg.

At step 11, the source IMS access leg is released according to the TS 23.237[9]. At step 12, the MSC server 108 indicates that the response is for SRVCC video or voice operation as applicable as shown in Table 11. If the MME 106, at step 5a, has requested a voice/video operation but it is not supported by the MSC server 108, then the MSC server 108 sends back a response indicating that SRVCC operation cannot be performed for video and continues with the SRVCC operation for voice only.

At step 13, the source MME 106 synchronizes the two prepared relocations and sends a HO command message to the source E UTRAN 104. At step 14, the E UTRAN 104 sends the HO from E UTRAN command message to the UE 102. At step 15, the UE 102 tunes to a target UTRAN/GERAN cell. At step 16, HO detection at the target RNS/BSS 114 occurs. The UE 102 sends a HO complete message via the target RNS/BSS 114 to the target MSC 110. Further, the target MSC 110 sends an SES (Handover complete) message to the MSC Server if the target MSC 110 is not the MSC server.

At step 17a, relocation HO complete message is received at the target MSC 110. At step 17b and 17c, the HO complete message is sent from the target MSC 110 to the MSC server 108 and also an answer to the HO is sent. At step 17d, the MSC server 108 sends back the PS to CS complete notification message to the source MME 106 with an indication that SRVCC has been performed for video call application. At step 17e, the location is updated at the HLR. At step 18, the PS to CS indicator is included for video bearers also and the MBR is set to 0 for video bearers also for Gn/Gp SGSN. At step 19, location continuity is managed for emergency calls.

Figure 5:
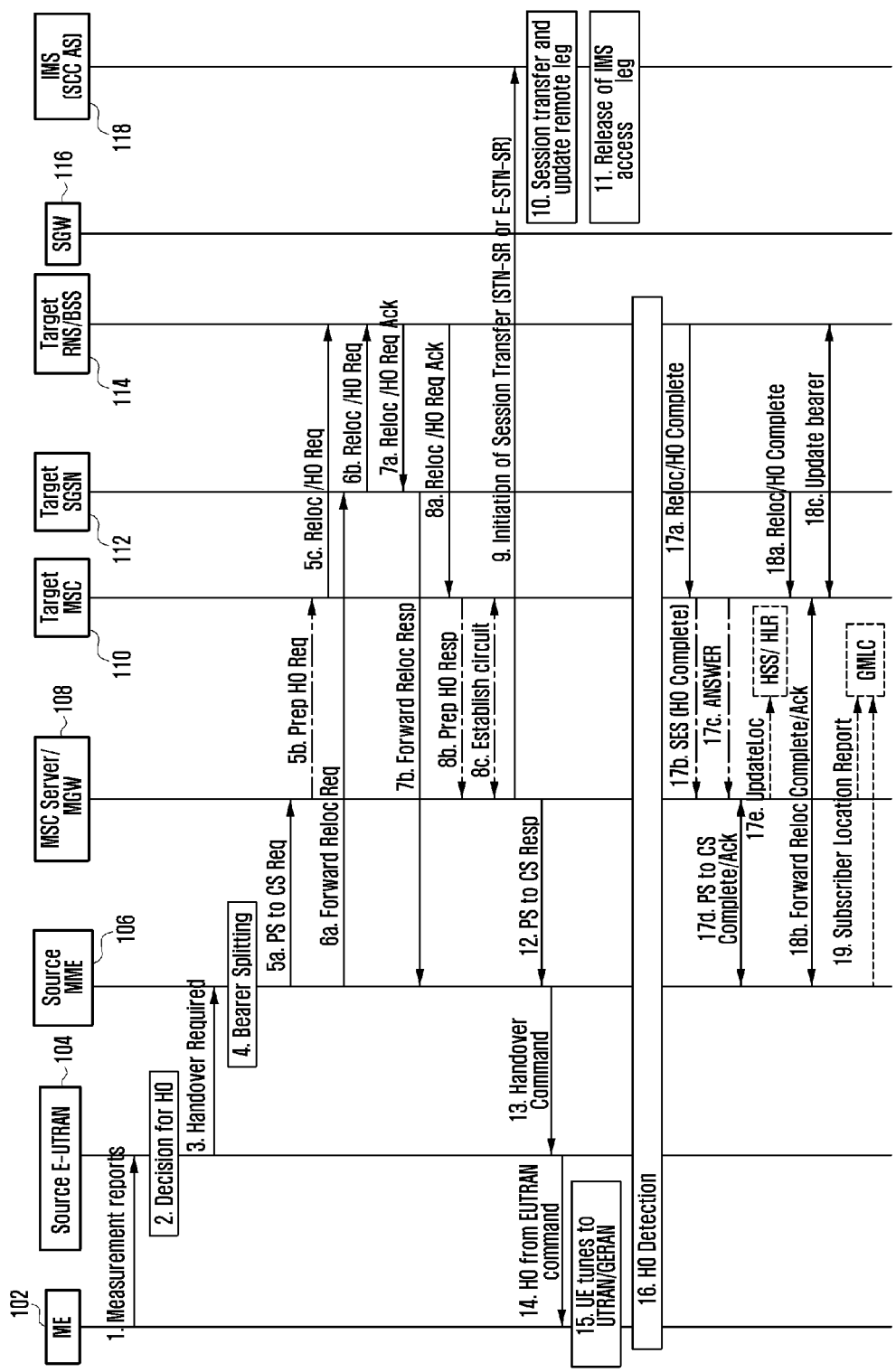
FIG. 5 illustrates a flow diagram depicting a method to support video call application during handover, in accordance with an embodiment of the present invention.

FIG. 5 illustrates a flow diagram depicting a method to support video call application during handover, in accordance with an embodiment of the present invention.

The method, receives a handover indication from a PS network to a CS network. The method further identifies a plurality of network bearers corresponding to a video call application based on a quality of service identifiers. The plurality of network bearers is corresponding to voice bearer and video bearer belonging to an application. The method also involves sending the video SRVCC capabilities to one or more Network Element (NE). In an embodiment, the handover is from a PS network to a CS network and corresponds to a video SRVCC service. In an embodiment, the quality of service identifiers are Quality of Service Class Identifiers (QCI).

The method is applied when different bearers are established for voice and video streams corresponding to video call application and based on the assumption that QCI with value '2' is always accompanied by QCI with value '1'. Further, no application using only conversational video (where QCI value is '2'). This method works correctly only when both bearers with QCI with value '1' and QCI with value '2' are present and the MME knows that they belong to same application instance and have to be transferred to CS domain.

In the method, the eNodeB checks whether any bearer having QCI value as '1' is present, irrespective of whether the bearer having QCI value '2' is present or not. Further, if the bearer with QCI value as '1' is present then the eNodeB triggers SRVCC operation. The MME separates the voice or voice and video bearers from other PS bearers and sends the PS to CS message to the MSC server. Further, if the bearer having QCI value as '2' is also present then it sends an indication that video SDP should also be offered. It also initiates the handover of the rest of the PS bearers excluding the bearers having QCI value as '1' and '2' respectively towards the target SGSN.

However, if the MSC server has been enhanced for video, then it offers SDP for voice and video otherwise it sends back a response to the MME indicating that video cannot be transferred and continues with the transfer of voice only. The MME then de-activates the corresponding video bearers after getting a response that video is not supported. The MSC server sends a SIP INVITE request to the Session Centralization and Continuity Application Server SCC AS containing the SDP of voice as well as video if both can be supported at the MSC server.

However, if the MSC server supports only voice then it offers SDP only for voice. The SCC AS can take following actions depending upon the presence of voice (QCI value as '1') and video (QCI value as '2') bearers. First action is when a video call application is in active state with voice and video bearers then it is transferred first and other voice and video call applications are transferred in held state. Second action is when a voice call application is in active state it is transferred first and other video and voice call applications, if any, are transferred in held state. The method is further explained with the help of a flow diagram.

Referring to FIG. 5, the UE 102, at step 1 sends measurement reports to the eNodeB 104. At step 2, the eNodeB 104 decides to trigger the SRVCC handover based on the presence of bearer having QCI value as '1' and when SRVCC operation is possible at the MME 106. At step 3, the eNodeB 104 should prepare the transparent container indicating that video bearer (QCI value as '2') as well as voice bearer (QCI value as '1')

should be transferred to CS side. The information for preparing transparent container is included in TS 25.413[4] and TS 36.413[3] for UTRAN and E-UTRAN respectively. At step 4, the MME 106 performs the split based on the presence of bearers having QCI value as '2' and '1' and the SRVCC Handover indication.

At step 5a, the MME 106 sends an indication to the MSC server 108 in PS to CS request to offer video SDP as well as voice as shown in Table 3. At step 5b, the MSC server 108 sends a reject message, if the MSC server 108 cannot support video and receives an indication to prepare the video SDP from the MME 106. The reject message can be sent independently or as a part of PS to CS Response as explained at step 12. At step 5c, the target MSC 110 requests resource allocation for the CS re-location by sending the Relocation Request/Handover Request (additional Source to Target Transparent Container) message to the target RNS/BSS 114.

At step 6, the PDP context includes context for video bearer(s) and a PS to CS indicator shall be set for video bearers also. At step 7, the target RNS/BSS 114 assigns the appropriate CS and PS resources after the target RNS/BSS 114 receives both the CS relocation/handover request with the PS relocation/handover request. At step 7a, the target RNS/BSS 114 acknowledges the prepared PS relocation/handover by sending the Relocation Request Acknowledge/Handover Request Acknowledge (Target to Source Transparent Container) message to the target SGSN 112. At step 7b, the target SGSN 112 sends a Forward Relocation Response (Target to Source Transparent Container) message to the source MME 106.

At step 8a, the target RNS/BSS 114 acknowledges the prepared CS relocation/handover by sending the Relocation Request Acknowledge/Handover Request Acknowledge (Target to Source Transparent Container) message to the target MSC 110. At step 8b, the target MSC 110 sends a Prepare Handover Response (Target to Source Transparent Container) message to the MSC Server 108. At step 8c, a circuit connection is established between the target MSC 110 and the MGW associated with the MSC server 108.

At step 9, the MSC server 108 receives an indication from MME 106 to prepare video SDP, the MSC server 108 then prepares video SDP along with voice SDP otherwise it offers SDP for voice only. At step 10, during the execution of the Session Transfer procedure the remote end is updated with the SDP of the CS access leg according to TS 23.237 [9]. The downlink flow of VoIP packets is switched towards the CS access leg at this point. At step 11, the source IMS access leg is released according to TS 23.237[9].

At step 12, the MSC server 108 includes an indication whether it prepared the SDP for video besides voice as shown in Table 11. At step 13, the source MME 106 synchronizes the two prepared relocations and sends a Handover Command message to the source E UTRAN 104. At step 14, the E-UTRAN 104 sends a HO message from E UTRAN command message to the UE 102. At step 15, the UE 102 tunes to the target UTRAN/GERAN cell.

At step 16, a HO detection at the target RNS/BSS 114 occurs. The UE 102 sends a Handover Complete message via the target RNS/BSS 114 to the target MSC 110. However, if the target MSC 110 is not the MSC server, then the target MSC 110 sends an SES (Handover Complete) message to the MSC server. At step 17a, relocation HO complete message is received at the target MSC 110. At step 17b and 17c, the HO complete message is sent from the target MSC 110 to the MSC server 108 and also an answer to the HO is sent. At step 17d, the MSC server 108 sends back the PS to CS complete notification message to the source MME 106 with an indication that SRVCC has been performed for video call application. At step 17e, the location is updated at the HLR.

At step 18a, the Reloc/HO complete message is sent by the target RNS/BSS 114 to the target SGSN 112. At step 18b, the Reloc/HO complete/Ack message is sent by the target SGSN 112 to the source MME 106. At step 18b, the bearers are updated at the target SGSN 112 and the SGW 116. The PS to CS indicator is included for video bearers also and the MBR is set to 0 for video bearers also for Gn/Gp SGSN. At step 19, location continuity for emergency calls is maintained.

Figure 6:
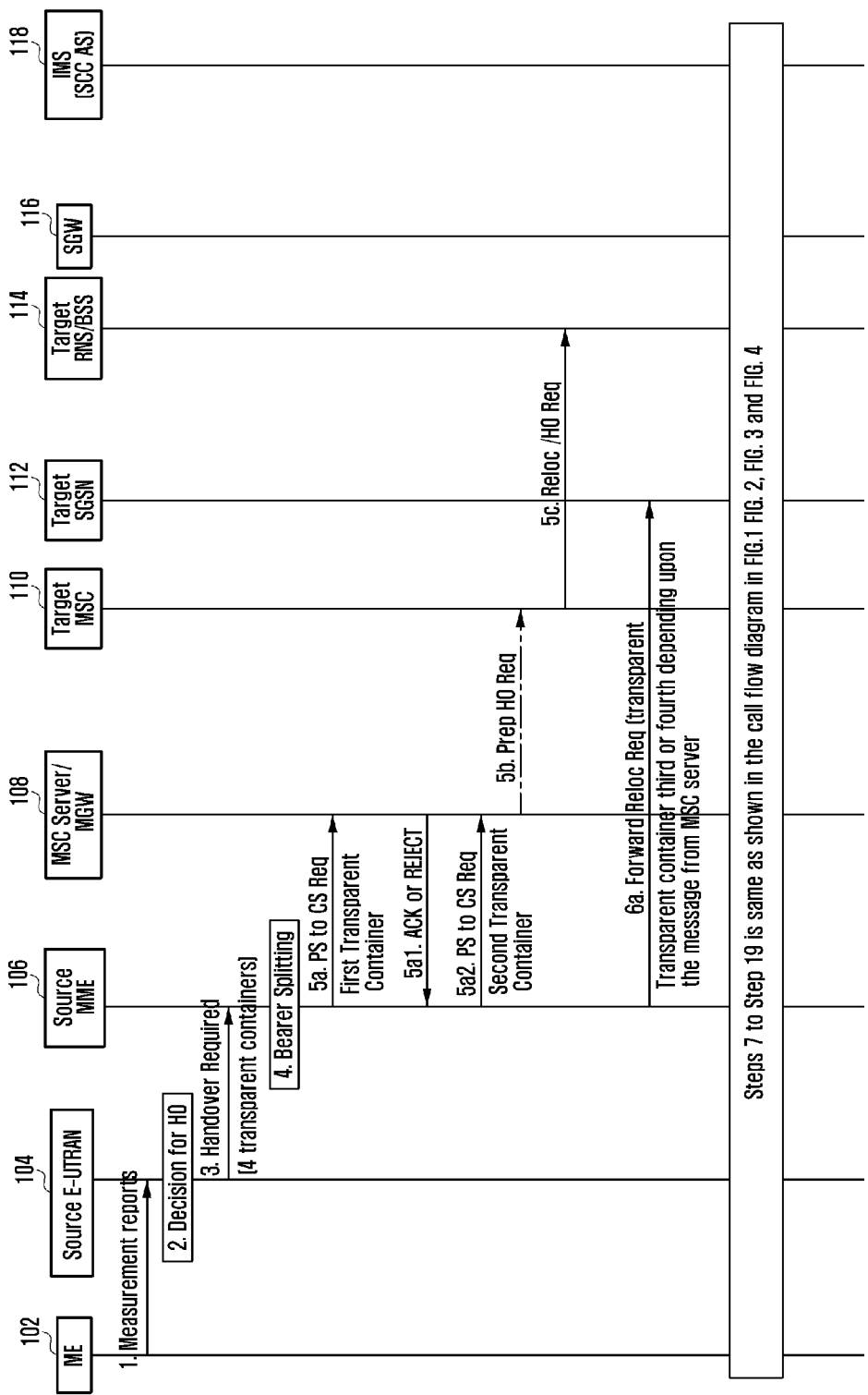
FIG. 6 illustrates a flow diagram depicting a method to support video call application during Handover, in accordance with another embodiment of the present invention.

FIG. 6 illustrates a flow diagram depicting a method to support video call application during Handover, in accordance with another embodiment of the present invention.

The method, receives a handover indication from a PS network to a CS network. The method further identifies a plurality of network bearers corresponding to a video call application based on a quality of service identifiers. The plurality of network bearers is corresponding to voice bearer and video bearer belonging to an application. The method also involves sending the video SRVCC capabilities to one or more Network Element (NE). In an embodiment, the handover is from a PS network to a CS network and corresponds to a video SRVCC service. In an embodiment, the quality of service identifiers are Quality of Service Class Identifiers (QCI).

In an embodiment, the method prepares a plurality of transparent containers based on target domain when a video SRVCC operation is to be performed. In an embodiment, the plurality of transparent containers is performed by the first NE (eNodeB).

In an embodiment, at least one of the plurality of transparent containers is sent from the first NE to the second NE (MME/SGSN). For example, all the four containers, that is a first container, a second container, a third container and a fourth will be sent to the second NE. Then at least one container is sent to the third NE (MSC server) and second NE (MME) waits for a response before sending container to a Serving GPRS Support Node (SGSN). Thereafter, a response message is sent from the third NE the second NE with an acknowledgement message or a reject message. In an embodiment, a transparent container identified based on a target bearers is sent to the MSC server and to the SGSN based on the response message received from the MSC server. The detailed method with reference to the specific network elements is further explained below.

In the method, for SRVCC operation, eNodeB prepares transparent containers for the target domains. If the target cell is UTRAN then eNodeB prepares a single container for both CS and PS domains containing information about all the bearers however, it contains a field 'PS RAB(Radio Access Bearer) to Be Replaced' in the source Radio Network Controller (RNC) to the target RNC transparent container as per the TS 25.413[7]. These PS RABs to be replaced contain the RAB IDs of the RABs which are to be transferred to the CS side and this field is only applicable for the SRVCC handover where in the PS bearer corresponding the voice or video handover is transferred to the CS domain.

Further, separate containers are prepared for CS and PS domains, if the target is GERAN. The transparent container for the target CS domain contains information about the bearers to be transferred to the CS side whereas the PS domain contains information about the bearers to be transferred to the PS domain. This is possible, when the MSC server supports both voice and video calls so that video can be transferred to the CS side. In another case, the video related bearers need to be either deactivated by MME or transferred to the PS domain if the MSC server does not support video call and only voice call needs to be transferred to CS side.

To avoid reserving extra resources on the target side, the eNodeB prepares four transparent containers. First transparent container is a CS domain transparent container with information about only voice bearers. Second transparent container is a CS domain transparent container with information for both voice and video. Third transparent container is a PS domain transparent container containing information about PS bearers excluding all voice and video related bearers. Fourth transparent container is a PS domain transparent container containing information about PS bearers including video but excluding voice. The eNodeB forwards all the four containers to the MME.

The MME sends the second transparent container to MSC server assuming the MSC server supports both voice and video call operation and waits for a response from MSC server before sending Forward relocation request to the SGSN. The MSC server responds back to the MME with either an ACK message indicating that video operation is supported or being performed or with a REJECT message indicating that video operation is not supported at the MSC server. The MME takes actions based on the message received from the MSC server. A Forwarded Relocation Request message is sent to SGSN with third transparent container if the MSC server has responded with an ACK, then . Further the MME sends back another PS to CS request message to the MSC server including the first transparent container and sends Forward Relocation Request message to the SGSN with fourth transparent container, if the MSC server has responded with REJECT message. The MSC server uses the transparent container sent in the PS to CS request message for the CS domain.

Referring to FIG. 6, the UE 102 at step 1 sends measurement reports to the eNodeB 104. At step 2, the eNodeB 104 decides to trigger SRVCC handover. At step 3, the eNodeB 104 prepares four transparent containers and sends all the four transparent containers in a Handover required message to MME 106. The information for preparing transparent container for UTRAN network is included in Technical Specification 25.413[4] and for E-UTRAN network in TS 36.413[3]. At step 4, the MME 106 performs a split based on the presence of bearers having value '1' and '2' (QCI='2' and QCI='1') and the SRVCC Handover indication.

At step 5*a*, the MME 106 sends an indication to the MSC server 108 in PS to CS request to offer video SDP as well as voice. The MME 106 also sends the second transparent container to the MSC server 108 assuming the MSC server 108 supports both voice and video call operation and waits for a response from MSC server 108 before sending Forward relocation request to the SGSN 112. At step 5*a*1, the MSC server 108 responds back to the MME 106 with either an ACK message indicating that video operation is supported and will be performed or with a REJECT message indicating that video operation is not supported at MSC server 108. At 5*a*2, the MME 106 sends back another PS to CS request message to the MSC server 108 including the first transparent container if the MSC server 108 has responded with REJECT message.

At step 5*b*, the MSC server 108 does not reject the message because of the containers obtained from the MME 106. At step 5*c*, the target MSC 110 requests resource allocation for the CS relocation by sending the Relocation Request/Handover Request (additional Source to Target Transparent Container) message to the target RNS/BSS 114. At step 6, the PDP context includes context for video bearer(s). The PS to CS indicator is set for video bearers. The MME 106 sends the Forwarded Relocation Request message to SGSN 112 with the third transparent container, if the MSC server 108 has responded with an ACK,. The MME 106 sends the fourth transparent container to the SGSN 112 if the MSC server 108 has responded with a REJECT message. The steps 7 to 19 are performed as explained in conjunction with FIG. 1, FIG. 2 and FIG. 3 and FIG. 4.

FIG. 7 illustrates a flow diagram depicting a method to support video call application during Handover, in accordance with yet another embodiment of the present invention.

The method, receives a handover indication from a PS network to a CS network. The method further identifies a plurality of network bearers corresponding to a video call application based on a quality of service identifiers. The plurality of network bearers is corresponding to voice bearer and video bearer belonging to an application. The method also involves sending the video SRVCC capabilities to one or more Network Element (NE). In an embodiment, the handover is from a PS network to a CS network and corresponds to a video SRVCC service. In an embodiment, the quality of service identifiers are Quality of Service Class Identifiers (QCI).

In an embodiment, the method prepares a plurality of transparent containers based on target domain when a video SRVCC operation is to be performed. In an embodiment, the plurality of transparent containers is performed by the first NE (eNodeB). In an embodiment, at least one of the plurality of transparent containers is sent from the first NE to the second NE (MME/SGSN). For example, all the four containers, that is a first container, a second container, a third container and a fourth will be sent to the second NE. Then plurality of containers is sent to the third NE (MSC server) and the second NE (MME) waits for a response before sending container to a Serving GPRS Support Node (SGSN).

Thereafter, a response message is sent from the third NE the second NE with an acknowledgement message or a reject message. In an embodiment, the second NE sends at least one of the containers from the plurality of transparent containers to a target PS domain based on the response message from the third NE. The detailed method with reference to the specific network elements is further explained below.

In the method, the eNodeB prepares four transparent containers. First transparent container is a CS domain transparent container with information about only voice bearers. Second transparent container is a CS domain transparent container with information for both voice and video. Third transparent container is a PS domain transparent container containing information about PS bearers excluding all voice and video related bearers. Fourth transparent container is a PS domain transparent container containing information about PS bearers including video but excluding voice. The eNodeB forwards all four transparent containers to the MME.

The MME sends the first and the second transparent containers to the MSC server and waits for a response from MSC server before sending Forward relocation request to the SGSN. The MSC server then uses the appropriate transparent container, for example the first transparent container or the second transparent container depending upon the capability of the MSC server to support video. The MSC server responds back to the MME with either an ACK message indicating that video operation is supported and will be performed or with a REJECT message indicating that video operation is not supported at the MSC server.

The MME takes the following actions based on the message received from the MSC server. The MME sends Forwarded Relocation Message to the SGSN with the third transparent container if the MSC server has responded with an ACK. Further, the MME sends Forward Relocation Request message to the SGSN with the fourth transparent container, if the MSC server has responded with REJECT message.

Referring to FIG. 7, the UE 102, at step 1, sends the measurement reports to the eNodeB 104. The eNodeB 104 decides to trigger the SRVCC handover. The eNodeB 104 prepares four transparent containers and sends all the four containers in the Handover required message to the MME 106. The information for preparing transparent container is included in TS 25.413[4] and TS 36.413[3] for UTRAN and E-UTRAN respectively.

At step 4, the MME 106 performs the split based on the presence of bearers having QCI value as '2' and '1' (QCI=2 and QCI=1) and the SRVCC Handover indication. At 5a, the MME 106 sends an indication to the MSC server 108 in PS to CS request to offer video and voice SDP. The MME 106 also sends the first and second transparent containers to MSC server 108 and waits for a response from the MSC server 108 before sending Forward relocation request to the SGSN 112. At step 5a1, the MSC server 108 responds back to the MME 106 with either an ACK message indicating that video operation is supported and will be performed or with a REJECT message indicating that video operation is not supported at MSC server 108.

At step 5b, the MSC server 108 includes the first or second transparent container depending upon whether it supports the video or not. At step 5c, the target MSC 110 requests resource allocation for the CS relocation by sending the Relocation Request/Handover Request (additional Source to Target Transparent Container) message to the target RNS/BSS 114. At step 6, the PDP context includes context for video bearer(s) also. The PS to CS indicator is also set for video bearers.

Further, the MME 106 sends the Forwarded Relocation Request message to SGSN with the third transparent container, if the MSC server 108 has responded with an ACK. The MME 106 sends the fourth transparent container to the SGSN 112, if MSC server 108 has responded with a REJECT message. The steps 7 to 19 are performed as explained in conjunction with FIG. 1, FIG. 2 and FIG. 3 and FIG. 4.

Various embodiments of the present invention described above provide the following advantages. The present invention provides a method for managing video calls during Handover (HO) in plurality of radio access networks. The present invention enables a user to move from one radio access network to another radio access network during an in-progress video call without interruption. Further, the method has no impact on the existing radio access network and thus it can be implemented without changing the existing radio access network systems.

The method also minimizes the handover preparation phase. In addition, HO from a higher generation communication network, for example the fourth generation radio access network to the lower generation radio access network, for example third generation radio access network is carried out easily without any impact on a Quality of Service.

Further, the method provides efficient compatibility during HO from a radio access network supporting only Packet Switched (PS) network to another radio access network supporting Circuit Switched (CS) and/or PS. Further, during the HO process, the method effectively manages voice and video bearers. The method in-advance identifies a list of bearers that can be managed by the target cell. Hence, the overall overhead of HO process is reduced effectively and this increases efficiency of the radio access networks.

The method avoids unnecessary signaling as a core network element (for example MME or SGSN) is updated with sufficient information about the target cell capabilities. Hence the core network element can take correct decision associated with handling of video calls.

In the preceding specification, the present disclosure and its advantages have been described with reference to exemplary embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

Exemplary embodiments of the present disclosure are related to the use of a computer system for implementing the techniques described herein. In one exemplary embodiment, the techniques are performed by a processor by using information included in a memory. Such information can be read into the main memory from a machine-readable medium, such as a storage device. The information included in the memory causes the processor to perform the method described herein.

The term "machine-readable medium" as used herein refers to any medium that participates in providing data that causes a machine to operation in a specific fashion. In an exemplary embodiment which is implemented using the computer system, various machine-readable mediums are involved, for example, in providing information to the processor for execution. The machine-readable medium can be a storage media. Storage media includes both non-volatile media and volatile media. Non-volatile media includes, for example, optical or magnetic disks, such as a server storage unit. Volatile media includes dynamic memory. All such media must be tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge.

In an exemplary embodiment, the machine-readable medium can be a transmission media including coaxial cables, copper wire and fiber optics, including the wires that include a bus. Transmission media can also take the form of acoustic or light waves, such as those generated during radio-wave and infra-red data communications. Examples of machine-readable medium may include, but are not limited to, a carrier wave as or any other medium from which a computer can read, for example online software, download links, installation links, and online links.

APPENDIX

Table 1 is a table regarding Video SRVCC handover indication in Handover Required message as per TS 36.413[6].

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| Handover Type | M | | 9.2.1.13 | | YES | reject |
| Cause | M | | 9.2.1.3 | | YES | ignore |
| Target ID | M | | 9.2.1.6 | | YES | reject |
| Direct Forwarding Path Availability | O | | 9.2.3.15 | | YES | ignore |
| SRVCC HO Indication | O | | 9.2.1.59 | | YES | reject |
| Video SRVCC HO Indication | O | | | | YES | reject |
| Source to Target Transparent Container | M | | 9.2.1.56 | | YES | reject |
| Source to Target Transparent Container Secondary | O | | Source to Target Transparent Container 9.2.1.56 | | YES | reject |
| MS Classmark 2 | C-ifSRVCC toGERAN | | 9.2.1.64 | | YES | reject |
| MS Classmark 3 | C-ifSRVCC toGERAN | | 9.2.1.65 | | YES | ignore |

Table 2 is a table regarding Video SRVCC handover indication in Relocation Required message as per TS 25.413[8]

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Relocation Type | M | | 9.2.1.23 | | YES | reject |
| Cause | M | | 9.2.1.4 | | YES | ignore |
| Source ID | M | | 9.2.1.24 | | YES | ignore |
| Target ID | M | | 9.2.1.25 | | YES | reject |
| MS Classmark 2 | C ifGSM-CStarget | | 9.2.1.26 | | YES | reject |
| MS Classmark 3 | C ifGSM-CStarget | | 9.2.1.27 | | YES | ignore |
| Source To Target Transparent Container | C ifUMTStarget or ifEUTRA target | | 9.2.1.30A | | YES | reject |
| Old BSS To New BSS Information | O | | 9.2.1.29 | Can optionally be used if GSM target but not used for UMTS target. | YES | ignore |
| GERAN Classmark | O | | 9.2.1.57 | | YES | ignore |
| Source BSS To Target BSS Transparent Container | O | | 9.2.1.79 | Shall be included if, and only if, GSM PS domain is target. | YES | ignore |
| SRVCC HO Indication | O | | 9.2.1.88 | | YES | reject |
| Video SRVCC HO Indication | O | | | | YES | reject |
| CSG id | O | | 9.2.1.62 | | YES | reject |
| Cell Access Mode | O | | 9.2.1.93 | | YES | reject |

The PS to CS request message is shown in Table 3.

TABLE 3

| Information elements | P | Condition/Comment | IE Type | Ins. |
|---|---|---|---|---|
| IMSI | C | This IE shall be included in the message except for the cases: The UE is emergency attached and it is UICCless. The UE is emergency attached and the IMSI is not authenticated. | IMSI | 0 |
| ME Identity (MEI) | C | This IE shall be included in the message for the following cases: The UE is emergency attached and it is UICCless. The UE is emergency attached and the IMSI is not authenticated. | MEI | 0 |
| Sv Flags | C | The following flags are applicable: EmInd—this flag shall be sent if this session is for an emergency call. ICS—this flag shall be sent to request IMS Centralized Service support. | Sv Flags | 0 |
| MME/SGSN Sv Address for Control Plane | M | This IE specifies the address for control plane message which is chosen by the source MME/SGSN | IP-Address | 0 |
| MME/SGSN Sv TEID for Control Plane | M | This IE specifies the tunnel for control plane message which is chosen by the source MME/SGSN. The target MM shall include this TEID in the GTP header of all related control plane messages which are related to the requested bearer. | TEID-C | 0 |
| C-MSISDN | C | The MME/SGSN shall include C-MSISDN IE in the message except for the cases: The UE is emergency attached and it is UICClessThe UE is emergency attached and the IMSI is not authenticatedThe C-MSISDN is defined in 3GPP TS 23.003 [4]. | MSISDN | 0 |
| STN-SR | C | The MME/SGSN shall include STN-SR IE if this session is not for an emergency call. | STN-SR | 0 |
| MM Context for E-UTRAN SRVCC | C | The MME shall include mobile station classmarks, supported codecs, and CS Security key in MM Context for SRVCC for E-UTRAN SRVCC. The derivation of the CS security keys shall follow the procedures defined 3GPP TS 33.401 [7]. | MM Context for E-UTRAN SRVCC | 0 |
| MM Context for UTRAN SRVCC | C | The SGSN shall include mobile station classmarks, supported codecs, and CS Security key in MM Context for SRVCC for UTRAN (HSPA) SRVCC. The derivation of the CS security keys shall follow the procedures defined 3GPP TS 33.102[10]. | MM Context for UTRAN SRVCC | 0 |
| Source to Target Transparent Container | M | The MME or SGSN shall include Source to Target Transparent Container IE | Source to Target Transparant Container IE | 0 |
| Target RNC ID | C | This IE shall be used to identify the target access for SRVCC handover to UTRAN (note 1). | Target RNC ID | 0 |
| Target Cell ID | C | This IE shall be used to identify the target access for SRVCC handover to GERAN (note 1). | Target Global Cell ID | 0 |
| Video SRVCC Indication | M | This IE shall be used to identify whether SRVCC operation is triggered for voice or video | | |
| Private Extension | O | None | Private Extension | VS |

(note 1):
Based upon the SRVCC Handover procedure, either Target RNC ID or Target Cell ID shall be present in this message Table 4 is a table regarding PGW context as per TS 23.401 [1].

TABLE 4

| Field | Description | E-UTRAN | UTRAN/GERAN |
|---|---|---|---|
| IMSI | IMSI (International Mobile Subscriber Identity) is the subscriber permanent identity. | X | X |

TABLE 4-continued

| Field | Description | E-UTRAN | UTRAN/ GERAN |
|---|---|---|---|
| IMSI-unauthenticated-indicator | This is an IMSI indicator to show the IMSI is unauthenticated. | X | X |
| ME Identity | Mobile Equipment Identity (e.g. IMEI/IMEISV). | X | X |
| MSISDN | The basic MSISDN of the UE. The presence is dictated by its storage in the HSS. | X | X |
| Selected CN operator id | Selected core network operator identity (to support network sharing as defined in TS 23.251 [24]). | X | X |
| RAT type | Current RAT | X | X |
| Trace reference | Identifies a record or a collection of records for a particular trace. | X | X |
| Trace type | Indicates the type of trace | X | X |
| Trigger id | Identifies the entity that initiated the trace | X | X |
| OMC identity | Identifies the OMC that shall receive the trace record(s). | X | X |
| For each APN in use: NOTE: The following entries are repeated for each APN. | | | |
| APN in use | The APN currently used. The APN shall be composed of the APN Network Identifier and the APN Operator Identifier. | X | X |
| APN-AMBR | The maximum aggregated uplink and downlink MBR values to be shared across all Non-GBR bearers, which are established for this APN. | X | X |
| For each PDN Connection within the APN: NOTE: The following entries are repeated for each PDN connection within the APN. | | | |
| IP Address(es) | IPv4 address and/or IPv6 prefix | X | X |
| PDN type | IPv4, IPv6, or IPv4v6 | X | X |
| S-GW Address in Use (control plane) | The IP address of the S-GW currently used for sending control plane signalling. | X | X |
| S-GW TEID for S5/S8 (control plane) | S-GW Tunnel Endpoint Identifier for the S5/S8 interface for the control plane. (For GTP-based S5/S8 only). | X | X |
| S-GW Address in Use (user plane) | The IP address of the S-GW currently used for sending user plane traffic. (For PMIP-based S5/S8 only). | X | X |
| S-GW GRE Key for downlink traffic (user plane) | Serving GW assigned GRE Key for the S5/S8 interface for the user plane for downlink traffic. (For PMIP-based S5/S8 only). | X | X |
| P-GW IP address for S5/S8 (control plane) | P-GW IP address for the S5/S8 for the control plane signalling. | X | X |
| P-GW TEID for S5/S8 (control plane) | P-GW Tunnel Endpoint Identifier for the S5/S8 control plane interface. (For GTP-based S5/S8 only). | X | X |
| P-GW Address in Use (user plane) | The IP address of the P-GW currently used for sending user plane traffic. (For PMIP-based S5/S8 only). | X | X |
| P-GW GRE Key for uplink traffic (user plane) | PDN GW assigned GRE Key for the S5/S8 interface for the user plane for uplink traffic. (For PMIP-based S5/S8 only). | X | X |
| MS Info Change Reporting support indication | The MME and/or SGSN serving the UE support(s) procedures for reporting User Location Information and/or User CSG Information changes. | | X |
| MS Info Change Reporting Action | Denotes whether the MME and/or the SGSN is/are requested to send changes in User Location Information and/or User CSG Information changes for this bearer. For User CSG Information, this field denotes separately whether the MME/SGSN are requested to send changes in User CSG Information for (a) CSG cells, (b) hybrid cells in which the subscriber is a CSG member, and (c) hybrid cells in which the subscriber is not a CSG member, or any combination of the above. | | X |
| BCM | The negotiated Bearer Control Mode for GERAN/UTRAN. | | X |

TABLE 4-continued

| Field | Description | E-UTRAN | UTRAN/ GERAN |
|---|---|---|---|
| Default Bearer | Identifies the default bearer within the PDN connection by its EPS Bearer Id. The default bearer is the one which is established first within the PDN connection. (For GTP based S5/S8 or for PMIP based S5/S8 if multiple PDN connections to the same APN are supported). | X | X |
| EPS PDN Charging Characteristics | The charging characteristics of this PDN connection e.g. normal, prepaid, flat-rate and/ or hot billing. | | |
| For each EPS Bearer within the PDN Connection: NOTE 1: The following entries defining the EPS Bearer specific parameters are included within the set of parameters defining the PDN Connection. NOTE 2: The following entries are stored only for GTP-based S5/S8. | | | |
| EPS Bearer Id | An EPS bearer identity uniquely identifies an EPS bearer for one UE accessing via E-UTRAN | X | X |
| Identifier | An EPS bearer identity which uniquely correlates the bearers belonging to a single application. All the EPS bearers belonging to the same application will have the same identifier. | X | X |
| TFT | Traffic Flow Template | X | X |
| S-GW Address in Use (user plane) | The IP address of the S-GW currently used for sending user plane traffic. | X | X |
| S-GW TEID for S5/S8 (user plane) | S-GW Tunnel Endpoint Identifier for the S5/S8 interface for the user plane. | X | X |
| P-GW IP address for S5/S8 (user plane) | P-GW IP address for user plane data received from PDN GW. | X | X |
| P-GW TEID for S5/S8 (user plane) | P-GW Tunnel Endpoint Identifier for the GTP Based S5/S8 interface for user plane. | X | X |
| EPS Bearer QoS | ARP, GBR, MBR, QCI. | X | X |
| Charging Id | Charging identifier, identifies charging records generated by S-GW and PDN GW. | X | X |

Table 5 is a table regarding Bearer context within Create Bearer Request message as per 3GPP TS 29.274[5].

TABLE 5

| Information elements | P | Condition/Comment | CR | IE Type | Ins. |
|---|---|---|---|---|---|
| EPS Bearer ID | M | Shall be set to 0 | 1 | EBI | 0 |
| Identifier | M | Shall be the one assigned by the PCRF and passed onto the PGW. | | | |
| UL TFT | M | None | 1 | Bearer TFT | 0 |
| DL TFT | C | Shall be sent for PMIP based S5/S8 | 1 | Bearer TFT | 1 |
| S1-U SGW F-TEID | C | Shall be sent on S11 if the S1-U interface is used | 1 | F-TEID | 0 |
| S5/8-U PGW F-TEID | C | Shall be sent on S5/S8 | 1 | F-TEID | 1 |
| S12 SGW F-TEID | C | Shall be sent on S4 if the S12 interface is used | 1 | F-TEID | 2 |
| Bearer Level QoS | M | None | 1 | Bearer QoS | 0 |
| Charging Characteristics | C | Shall be included according to 3GPP TS 32.251 [8] | 1 | Charging Characteristics | 0 |
| Charging Id | M | None | 1 | Charging Id | 0 |
| Bearer Flags | O | Applicable flags: PPC (Prohibit Payload Compression) | 1 | Bearer Flags | 0 |

Bearer Context IE Type = 96 (decimal)

Length = n (decimal)

Table 6 is a table regarding SGW context as per TS 23.401 [].

TABLE 6

| Field | Description | E-UTRAN | UTRAN/ GERAN |
|---|---|---|---|
| IMSI | IMSI (International Mobile Subscriber Identity) is the subscriber permanent identity. | X | X |
| IMSI-unauthenticated-indicator | This is an IMSI indicator to show the IMSI is unauthenticated. | X | X |
| ME Identity | Mobile Equipment Identity (e.g. IMEI/IMEISV). | X | X |
| MSISDN | The basic MSISDN of the UE. The presence is dictated by its storage in the HSS. | X | X |
| Selected CN operator id | Selected core network operator identity (to support network sharing as defined in TS 23.251 [24]). | X | X |
| MME TEID for S11 | MME Tunnel Endpoint Identifier for the S11 interface | X | |
| MME IP address for S11 | MME IP address the S11 interface. | X | |
| S-GW TEID for S11/S4 (control plane) | S-GW Tunnel Endpoint Identifier for the S11 Interface and the S4 Interface (control plane). | X | X |
| S-GW IP address for S11/S4 (control plane) | S-GW IP address for the S11 interface and the S4 Interface (control plane). | X | X |
| SGSN IP address for S4 (control plane) | SGSN IP address for the S4 interface (Used by the S-GW). | | X |
| SGSN TEID for S4 (control plane) | SGSN Tunnel Endpoint Identifier for the S4 interface. | | X |
| Trace reference | Identifies a record or a collection of records for a particular trace. | X | X |
| Trace type | Indicates the type of trace | X | X |
| Trigger id | Identifies the entity that initiated the trace | X | X |
| OMC identity | Identifies the OMC that shall receive the trace record(s). | X | X |
| Last known Cell Id | This is the last location of the UE known by the network | X(NOTE 1) | X(NOTE 1) |
| Last known Cell Id age | This is the age of the above UE location information | X(NOTE 1) | X(NOTE 1) |
| For each PDN Connection: NOTE: The following entries are repeated for each PDN. | | | |
| APN in Use | The APN currently used. This APN shall be composed of the APN Network Identifier and the APN Operator Identifier. | X | X |
| EPS PDN Charging Characteristics | The charging characteristics of this PDN connection, e.g. normal, prepaid, flat-rate and/or hot billing. | X | X |
| P-GW Address in Use (control plane) | The IP address of the P-GW currently used for sending control plane signalling. | X | X |
| P-GW TEID for S5/S8 (control plane) | P-GW Tunnel Endpoint Identifier for the S5/S8 interface for the control plane. (For GTP-based S5/S8 only). | X | X |
| P-GW Address in Use (user plane) | The IP address of the P-GW currently used for sending user plane traffic. (For PMIP-based S5/S8 only) | X | X |
| P-GW GRE Key for uplink traffic (user plane) | PDN GW assigned GRE Key for the S5/S8 interface for the user plane for uplink traffic. (For PMIP-based S5/S8 only) | X | X |
| S-GW IP address for S5/S8 (control plane) | S-GW IP address for the S5/S8 for the control plane signalling. | X | X |
| S-GW TEID for S5/S8 (control plane) | S-GW Tunnel Endpoint Identifier for the S5/S8 control plane interface. (For GTP-based S5/S8 only). | X | X |
| S-GW Address in Use (user plane) | The IP address of the S-GW currently used for sending user plane traffic. (For PMIP-based S5/S8 only) | X | X |
| S-GW GRE Key for downlink traffic (user plane) | Serving GW assigned GRE Key for the S5/S8 interface for the user plane for downlink traffic. (For PMIP-based S5/S8 only) | X | X |
| Default Bearer | Identifies the default bearer within the PDN connection by its EPS Bearer Id. (For PMIP based S5/S8.) | X | X |

TABLE 6-continued

| Field | Description | E-UTRAN | UTRAN/GERAN |
|---|---|---|---|
| For each EPS Bearer within the PDN Connection: NOTE: The following entries defining the EPS Bearer specific parameters are included within the set of parameters defining the PDN Connection. | | | |
| EPS Bearer Id | An EPS bearer identity uniquely identifies an EPS bearer for one UE accessing via E-UTRAN | X | X |
| Identifier | An EPS bearer identity which uniquely correlates the bearers belonging to a single application. All the EPS bearers belonging to the same application will have the same identifier. | X | X |
| TFT | Traffic Flow Template | X | X |
| P-GW Address in Use (user plane) | The IP address of the P-GW currently used for sending user plane traffic. (For GTP-based S5/S8 only). | X | X |
| P-GW TEID for S5/S8 (user plane) | P-GW Tunnel Endpoint Identifier for the S5/S8 interface for the user plane. (For GTP-based S5/S8 only). | X | X |
| S-GW IP address for S5/S8 (user plane) | S-GW IP address for user plane data received from PDN GW. (For GTP-based S5/S8 only). | X | X |
| S-GW TEID for S5/S8 (user plane) | S-GW Tunnel Endpoint Identifier for the S5/S8 interface for the user plane. (For GTP-based S5/S8 only). | X | X |
| S-GW IP address for S1-u, S12 and S4 (user plane) | S-GW IP address for the S1-u interface (Used by the eNodeB), for the S12 interface (used by the RNC) and for the S4 interface (used by the SGSN). | X | X |
| S-GW TEID for S1-u, S12 and S4 (user plane) | S-GW Tunnel Endpoint Identifier for the S1-u interface, for the S12 interface (used by the RNC) and for the S4 interface (used by the SGSN). | X | X |
| eNodeB IP address for S1-u | eNodeB IP address for the S1-u interface (Used by the S-GW). | X | |
| eNodeB TEID for S1-u | eNodeB Tunnel Endpoint Identifier for the S1-u interface. | X | |
| RNC IP address for S12 | RNC IP address for the S12 interface (Used by the S-GW). | | X |
| RNC TEID for S12 | RNC Tunnel Endpoint Identifier for the S12 interface. | | X |
| SGSN IP address for S4 (user plane) | SGSN IP address for the S4 interface (Used by the S-GW). | | X |
| SGSN TEID for S4 (user plane) | SGSN Tunnel Endpoint Identifier for the S4 interface. | | X |
| EPS Bearer QoS | ARP, GBR, MBR, QCI. | X | X |
| Charging Id | Charging identifier, identifies charging records generated by S-GW and PDN GW. | X | X |

(NOTE 1):
When UE location information is made available from both E-UTRAN and UTRAN/GERAN, the Serving GW stores the "Last Known Cell Id" and the "Last Known Cell Id Age" with the least age.

Table 7 is a table regarding E-RAB setup request message as per TS 36.413[6].

TABLE 7

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | O | | 9.2.1.20 | | YES | reject |
| E-RAB to be Setup List | M | | | | YES | reject |
| >E-RAB To Be Setup Item IEs | | 1 to <maxnoof E-RABs> | | | EACH | reject |
| >> E-RAB ID | M | | 9.2.1.2 | | — | |

TABLE 7-continued

| IE/Group Name | Presence | Range | IE type and reference | Semantics description | Criticality | Assigned Criticality |
|---|---|---|---|---|---|---|
| >> Identifier | M | | xx | | | ignore |
| >> E-RAB Level QoS Parameters | M | | 9.2.1.15 | Includes necessary QoS parameters | — | |
| >> Transport Layer Address | M | | 9.2.2.1 | | — | |
| >> GTP-TEID | M | | 9.2.2.2 | EPC TEID | — | |
| >>NAS-PDU | M | | 9.2.3.5 | | YES | ignore |

Table 8 is a table regarding MME MM and EPS bearer context as per TS 23.401[1].

TABLE 8

| Field | Description |
|---|---|
| IMSI | IMSI (International Mobile Subscriber Identity) is the subscribers permanent identity. |
| IMSI-unauthenticated-indicator | This is an IMSI indicator to show the IMSI is unauthenticated. |
| MSISDN | The basic MSISDN of the UE. The presence is dictated by its storage in the HSS. |
| MM State | Mobility management state ECM-IDLE, ECM-CONNECTED, EMM-DEREGISTERED. |
| GUTI | Globally Unique Temporary Identity. |
| ME Identity | Mobile Equipment Identity (e.g. IMEI/IMEISV) Software Version Number |
| Tracking Area List | Current Tracking area list |
| TAI of last TAU | TAI of the TA in which the last Tracking Area Update was initiated. |
| E-UTRAN Cell Global Identity | Last known E-UTRAN cell |
| E-UTRAN Cell Identity Age | Time elapsed since the last E-UTRAN Cell Global Identity was acquired |
| CSG ID | Last known CSG ID when the UE was active |
| CSG membership | Last known CSG membership of the UE when the UE was active |
| Access mode | Access mode of last known ECGI when the UE was active |
| Authentication Vector | Temporary authentication and key agreement data that enables an MME to engage in AKA with a particular user. An EPS Authentication Vector consists of four elements: a) network challenge RAND, b) an expected response XRES, c) Key $K_{ASME}$, d) a network authentication token AUTN. |
| UE Radio Access Capability | UE radio access capabilities. |
| MS Classmark 2 | GERAN/UTRAN CS domain core network classmark (used if the MS supports SRVCC to GERAN or UTRAN) |
| MS Classmark 3 | GERAN CS domain radio network classmark (used if the MS supports SRVCC to GERAN) |
| Supported Codecs | List of codecs supported in the CS domain (used if the MS supports SRVCC to GERAN or UTRAN) |
| UE Network Capability | UE network capabilities including security algorithms and key derivation functions supported by the UE |
| MS Network Capability | For a GERAN and/or UTRAN capable UE, this contains information needed by the SGSN. |
| UE Specific DRX Parameters | UE specific DRX parameters for A/Gb mode, Iu mode and S1-mode |
| Selected NAS Algorithm | Selected NAS security algorithm |
| Selected AS Algorithm | Selected AS security algorithms. |
| eKSI | Key Set Identifier for the main key $K_{ASME}$. Also indicates whether the UE is using security keys derived from UTRAN or E-UTRAN security association. |
| $K_{ASME}$ | Main key for E-UTRAN key hierarchy based on CK, IK and Serving network identity |
| NAS Keys and COUNT | $K_{NASint}$, $K_{NASenc}$, and NAS COUNT parameter. |
| Selected CN operator id | Selected core network operator identity (to support network sharing as defined in TS 23.251 [24]). |

TABLE 8-continued

| Field | Description |
| --- | --- |
| Recovery | Indicates if the HSS is performing database recovery. |
| Access Restriction | The access restriction subscription information. |
| ODB for PS parameters | Indicates that the status of the operator determined barring for packet oriented services. |
| APN-OI Replacement | Indicates the domain name to replace the APN-OI when constructing the PDN GW FQDN upon which to perform DNS queries. This replacement applies for all the APNs in the subscriber's profile. |
| MME IP address for S11 | MME IP address for the S11 interface (used by S-GW) |
| MME TEID for S11 | MME Tunnel Endpoint Identifier for S11 interface. |
| S-GW IP address for S11/S4 | S-GW IP address for the S11 and S4 interfaces |
| S-GW TEID for S11/S4 | S-GW Tunnel Endpoint Identifier for the S11 and S4 interfaces. |
| SGSN IP address for S3 | SGSN IP address for the S3 interface (used if ISR is activated for the GERAN and/or UTRAN capable UE) |
| SGSN TEID for S3 | SGSN Tunnel Endpoint Identifier for S3 interface (used if ISR is activated for the E-UTRAN capable UE) |
| eNodeB Address in Use | The IP address of the eNodeB currently used. |
| eNB UE S1AP ID | Unique identity of the UE within eNodeB. |
| MME UE S1AP ID | Unique identity of the UE within MME. |
| Subscribed UE-AMBR | The Maximum Aggregated uplink and downlink MBR values to be shared across all Non-GBR bearers according to the subscription of the user. |
| UE-AMBR | The currently used Maximum Aggregated uplink and downlink MBR values to be shared across all Non-GBR bearers. |
| EPS Subscribed Charging Characteristics | The charging characteristics for the MS e.g. normal, prepaid, flat rate and/or hot billing. |
| Subscribed RFSP Index | An index to specific RRM configuration in the E-UTRAN that is received from the HSS. |
| RFSP Index in Use | An index to specific RRM configuration in the E-UTRAN that is currently in use. |
| Trace reference | Identifies a record or a collection of records for a particular trace. |
| Trace type | Indicates the type of trace |
| Trigger id | Identifies the entity that initiated the trace |
| OMC identity | Identifies the OMC that shall receive the trace record(s). |
| URRP-MME | URRP-MME indicating that the HSS has requested the MME to notify the HSS regarding UE reachability at the MME |
| CSG Subscription Data | The CSG Subscription Data is a list of CSG IDs for the visiting PLMN and for each CSG ID optionally an associated expiration date which indicates the point in time when the subscription to the CSG ID expires; an absent expiration date indicates unlimited subscription. |
| | For each active PDN connection: |
| APN in Use | The APN currently used. This APN shall be composed of the APN Network Identifier and the APN Operator Identifier. |
| APN Restriction | Denotes the restriction on the combination of types of APN for the APN associated with this EPS bearer Context. |
| APN Subscribed | The subscribed APN received from the HSS. |
| PDN Type | IPv4, IPv6 or IPv4v6 |
| IP Address(es) | IPv4 address and/or IPv6 prefixNOTE: The MME might not have information on the allocated IPv4 address. Alternatively, following mobility involving a pre-release 8 SGSN, this IPv4 address might not be the one allocated to the UE. |
| EPS PDN Charging Characteristics | The charging characteristics of this PDN connection, e.g. normal, prepaid, flat-rate and/or hot billing. |
| APN-OI Replacement | APN level APN-OI Replacement which has same role as UE level APN-OI Replacement but with higher priority than UE level APN-OI Replacement. This is an optional parameter. When available, it shall be used to construct the PDN GW FQDN instead of UE level APN-OI Replacement. |
| VPLMN Address Allowed | Specifies whether the UE is allowed to use the APN in the domain of the HPLMN only, or additionally the APN in the domain of the VPLMN. |
| PDN GW Address in Use (control plane) | The IP address of the PDN GW currently used for sending control plane signalling. |
| PDN GW TEID for S5/S8 (control plane) | PDN GW Tunnel Endpoint Identifier for the S5/S8 interface for the control plane. |

TABLE 8-continued

| Field | Description |
|---|---|
| MS Info Change Reporting Action | Need to communicate change in User Location Information and/or User CSG Information to the PDN GW with this EPS bearer Context. For User CSG Information, this field denotes separately whether the MME/SGSN are requested to send changes in User CSG Information for (a) CSG cells, (b) hybrid cells in which the subscriber is a CSG member and (c) hybrid cells in which the subscriber is not a CSG member. |
| EPS subscribed QoS profile | The bearer level QoS parameter values for that APN's default bearer (QCI and ARP) (see clause 4.7.3). |
| Subscribed APN-AMBR | The Maximum Aggregated uplink and downlink MBR values to be shared across all Non-GBR bearers, which are established for this APN, according to the subscription of the user. |
| APN-AMBR | The Maximum Aggregated uplink and downlink MBR values to be shared across all Non-GBR bearers, which are established for this APN, as decided by the PDN GW. |
| PDN GW GRE Key for uplink traffic (user plane) | PDN GW assigned GRE Key for the S5/S8 interface for the user plane for uplink traffic. (For PMIP-based S5/S8 only) |
| Default bearer | Identifies the EPS Bearer Id of the default bearer within the given PDN connection. |
| | For each bearer within the PDN connection: |
| EPS Bearer ID | An EPS bearer identity uniquely identifies an EP S bearer for one UE accessing via E-UTRAN |
| Identifier | An EPS bearer identity which uniquely correlates the bearers belonging to a single application. All the EPS bearers belonging to the same application will have the same identifier. |
| TI | Transaction Identifier |
| IP address for S1-u | IP address of the S-GW for the S1-u interfaces. |
| TEID for S1u | Tunnel Endpoint Identifier of the S-GW for the S1-u interface. |
| PDN GW TEID for S5/S8 (user plane) | P-GW Tunnel Endpoint Identifier for the S5/S8 interface for the user plane. (Used for S-GW change only). NOTE: The PDN GW TEID is needed in MME context as S-GW re-location is triggered without interaction with the source S-GW, e.g. when a TAU occurs. The Target S-GW requires this Information Element, so it must be stored by the MME. |
| PDN GW IP address for S5/S8 (user plane) | P GW IP address for user plane for the S5/S8 interface for the user plane. (Used for S-GW change only). NOTE: The PDN GW IP address for user plane is needed in MME context as S-GW relocation is triggered without interaction with the source S-GW, e.g. when a TAU occurs. The Target S GW requires this Information Element, so it must be stored by the MME. |
| EPS bearer QoS | QCI and ARP optionally: GBR and MBR for GBR bearer |
| TFT | Traffic Flow Template. (For PMIP-based S5/S8 only) |

Table 9 is a table regarding E-RAB setup response message as per TS 36.413[6].

TABLE 9

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | ignore |
| eNB UE S1AP ID | M | | 9.2.3.4 | | YES | ignore |
| E-RAB Setup List | O | | | | YES | ignore |
| >E-RAB Setup Item IEs | | 1 to <maxnoof E-RABs> | | | EACH | ignore |
| >> E-RAB ID | M | | | | | — |
| >> Identifier | M | | xx | | | ignore |

TABLE 9-continued

| IE/Group Name | Presence | Range | IE type and reference | Semantics description | Criticality | Assigned Criticality |
|---|---|---|---|---|---|---|
| >> Transport Layer Address | M | | 9.2.2.1 | | — | |
| >> GTP-TEID | M | | 9.2.2.2 | eNB TEID | — | |
| E-RAB Failed to Setup List | O | | E-RAB List 9.2.1.36 | a value for E-RAB ID shall only be present once in E-RAB Failed to Setup List IE | YES | ignore |
| Criticality Diagnostics | O | | 9.2.1.21 | | YES | ignore |

Table 10 is a table regarding Bearer context within Create Bearer Response message as per 3GPP TS 29.274[5].

TABLE 10

| Information elements | P | Condition/Comment | CR | IE Type | Ins. |
|---|---|---|---|---|---|
| EPS Bearer ID | M | None | 1 | EBI | 0 |
| Identifier | M | Shall be the one assigned by the PCRF and passed onto the PGW. | | | |
| Cause | M | Indicates if the bearer handling was successful, and if not, gives information on the reason. | 1 | Cause | 0 |
| S1 eNodeB F-TEID | C | Shall be sent on S11 if the S1-U interface is used | 1 | F-TEID | 0 |
| S1 SGW F-TEID | C | Shall be sent on S11. It may be used to correlate the bearers with those in the Create Bearer Request | 1 | F-TEID | 1 |
| S5/8-U SGW F-TEID | C | Shall be sent on S5/S8 | 1 | F-TEID | 2 |
| S5/8-U PGW F-TEID | C | Shall be sent on S5/S8. It may be used to correlate the bearers with those in the Create Bearer Request | 1 | F-TEID | 3 |
| S12 RNC F-TEID | C | Shall be sent on S4 if the S12 interface is used | 1 | F-TEID | 4 |

Bearer Context IE Type = 96 (decimal)
Length = n (decimal)

Table 11 is a table regarding SRVCC PS to CS response message as per TS 29.280[7].

TABLE 11

| Information elements | P | Condition/Comment | IE Type | Ins. |
|---|---|---|---|---|
| Cause | M | | Cause | 0 |
| SRVCC rejected Cause | O | This IE may be sent if Cause value is differs from "Request accepted". MSC Server may include additional information to indicate the reason for rejecting SRVCC PS to CS request | SRVCC Cause | 0 |
| Video SRVCC Indication | M | This IE informs if the SRVCC HO has been performed for voice or video. | SRVCC type | 0 |
| MSC Server Sv Address for Control Plane | O | If the Cause IE contains the value "Request accepted", the target MSC server may include MSC server Sv Address for Control Plane IE in SRVCC PS to CS Response message if target MSC Server decides to use different IP address for the subsequent communication. The source MME/SGSN shall store this MSC server address and use it when sending subsequent control plane messages to this GTP-C tunnel. | IP Address | 0 |

TABLE 11-continued

| Information elements | P | Condition/Comment | IE Type | Ins. |
|---|---|---|---|---|
| MSC Server Sv TEID for Control Plane | C | The target MSC server shall include MSC server Sv Tunnel Endpoint Identifier for Control Plane IE in SRVCC PS to CS Response message if the Cause IE contains the value "Request accepted". The source MME/SGSN shall include this TEID-C in the GTP-C header of all subsequent uplink control plane messages from the source MME/SGSN to the target MSC servers. | TEID-C | 0 |
| Target to Source Transparent Container | C | If the Cause IE contains the value "Request accepted", this IE is included to carry the Handover command from the target access network. | Target to Source Transparant Container IE | 0 |
| Private Extension | O | None | Private Extension | VS |

Table 12 is a table regarding MS network capability information element as per 3GPP TS 24.008.

TABLE 12

<MS network capability value part> ::=
<GEA1 bits>
<SM capabilities via dedicated channels: bit>
<SM capabilities via GPRS channels: bit>
<UCS2 support: bit>
<SS Screening Indicator: bit string(2)>
<SoLSA Capability : bit>
<Revision level indicator: bit>
<PFC feature mode: bit>
<Extended GEA bits>
<LCS VA capability: bit>
<PS inter-RAT HO to UTRAN Iu mode capability: bit>
<PS inter-RAT HO to E-UTRAN S1 mode capability: bit>
<CSFB Capability: bit>
<ISR support: bit>
<SRVCC to GERAN/UTRAN capability: bit>
<EPC capability: bit>
<Spare bits>;
<GEA1 bits> ::= < GEA/1 :bit>;
<Extended GEA bits> ::= <GEA/2:bit><GEA/3:bit>< GEA/4:bit >< GEA/5:bit ><
GEA/6:bit ><GEA/7:bit>;
<Spare bits> ::= null | {<spare bit> < Spare bits >};
SS Screening Indicator
0 0 defined in 3GPP TS 24.080 [24]
0 1 defined in 3GPP TS 24.080 [24]
1 0 defined in 3GPP TS 24.080 [24]
1 1 defined in 3GPP TS 24.080 [24]
SM capabilities via dedicated channels
0 Mobile station does not support mobile terminated point to point SMS via CS domain
1 Mobile station supports mobile terminated point to point SMS via CS domain
SM capabilities via GPRS channels
0 Mobile station does not support mobile terminated point to point SMS via PS domain
1 Mobile station supports mobile terminated point to point SMS via PS domain
GPRS Encryption Algorithm GEA/1
0 encryption algorithm GEA/1 not available
1 encryption algorithm GEA/1 available
SoLSA Capability
0 The ME does not support SoLSA.
1 The ME supports SoLSA.
Revision level indicator
0 used by a mobile station not supporting R99 or later versions of the protocol
1 used by a mobile station supporting R99 or later versions of the protocol
PFC feature mode
0 Mobile station does not support BSS packet flow procedures
1 Mobile station does support BSS packet flow procedures
GEA/2
0 encryption algorithm GEA/2 not available
1 encryption algorithm GEA/2 available
GEA/3
0 encryption algorithm GEA/3 not available
1 encryption algorithm GEA/3 available TABLE 12-continued GEA/4
0 encryption algorithm GEA/4 not available
1 encryption algorithm GEA/4 available
GEA/5
0 encryption algorithm GEA/5 not available
1 encryption algorithm GEA/5 available
GEA/6
0 encryption algorithm GEA/6 not available
1 encryption algorithm GEA/6 available
GEA/7
0 encryption algorithm GEA/7 not available
1 encryption algorithm GEA/7 available
LCS VA capability (LCS value added location request notification capability)
This information field indicates the support of the LCS value added location request
notification via PS domain as defined in 3GPP TS 23.271 [105].
0 location request notification via PS domain not supported
1 location request notification via PS domain supported
PS inter-RAT HO to UTRAN Iu mode capability
This information field indicates the support of the PS inter-RAT HO to UTRAN Iu
mode.
0 PS inter-RAT HO to UTRAN Iu mode not supported
1 PS inter-RAT HO to UTRAN Iu mode supported
PS inter-RAT HO to E-UTRAN S1 mode capability
This information field indicates the support of the PS inter-RAT HO to E-UTRAN S1
mode.
0 PS inter-RAT HO to E-UTRAN S1 mode not supported
1 PS inter-RAT HO to E-UTRAN S1 mode supported
ISR support
0 The mobile station does not support ISR.
1 The mobile station supports ISR.
SRVCC to GERAN/UTRAN capability
0 SRVCC from UTRAN HSPA or E-UTRAN to GERAN/UTRAN not supported
1 SRVCC from UTRAN HSPA or E-UTRAN to GERAN/UTRAN supported
Video SRVCC to GERAN/UTRAN capability
0 video SRVCC from UTRAN HSPA or E-UTRAN to GERAN/UTRAN not
supported
1 video SRVCC from UTRAN HSPA or E-UTRAN to GERAN/UTRAN supported
EPC capability
This information field indicates if the MS supports access to the EPC via access
networks other than GERAN or UTRAN. The network can use this information to
decide whether to select a PDN Gateway or a GGSN. The MS shall set the indication
to "0" if a SIM is inserted in the MS.
0 EPC not supported
1 EPC supported
CSFB capability
This information field indicates the support of the CS fallback.
0 Mobile station does not support CS fallback
1 Mobile station supports CS fallbac Table 13 is a table regarding UE network capability information element as per 3GPP TS 24.301

TABLE 13

EPS encryption algorithms supported (octet 3)
EPS encryption algorithm EEA0 supported (octet 3, bit 8)

0    EPS encryption algorithm EEA0 not supported
1    EPS encryption algorithm EEA0 supported
     EPS encryption algorithm 128-EEA1 supported (octet 3, bit 7)

0    EPS encryption algorithm 128-EEA1 not supported
1    EPS encryption algorithm 128-EEA1 supported
     EPS encryption algorithm 128-EEA2 supported (octet 3, bit 6)

0    EPS encryption algorithm 128-EEA2 not supported
1    EPS encryption algorithm 128-EEA2 supported
     EPS encryption algorithm EEA3 supported (octet 3, bit 5)

0    EPS encryption algorithm EEA3 not supported
1    EPS encryption algorithm EEA3 supported
     EPS encryption algorithm EEA4 supported (octet 3, bit 4)

0    EPS encryption algorithm EEA4 not supported
1    EPS encryption algorithm EEA4 supported TABLE 13-continued EPS encryption algorithm EEA5 supported (octet 3, bit 3)

0    EPS encryption algorithm EEA5 not supported
1    EPS encryption algorithm EEA5 supported
     EPS encryption algorithm EEA6 supported (octet 3, bit 2)

0    EPS encryption algorithm EEA6 not supported
1    EPS encryption algorithm EEA6 supported
     EPS encryption algorithm EEA7 supported (octet 3, bit 1)

0    EPS encryption algorithm EEA7 not supported
1    EPS encryption algorithm EEA7 supported
     EPS integrity algorithms supported (octet 4)
     EPS integrity algorithm EIA0 supported (octet 4, bit 8)

0    EPS integrity algorithm EIA0 not supported
1    EPS integrity algorithm EIA0 supported
     EPS integrity algorithm 128-EIA1 supported (octet 4, bit 7)

0    EPS integrity algorithm 128-EIA1 not supported
1    EPS integrity algorithm 128-EIA1 supported
     EPS integrity algorithm 128-EIA2 supported (octet 4, bit 6)

0    EPS integrity algorithm 128-EIA2 not supported
1    EPS integrity algorithm 128-EIA2 supported

TABLE 13-continued

| | EPS integrity algorithm EIA3 supported (octet 4, bit 5) |
|---|---|
| 0 | EPS integrity algorithm EIA3 not supported |
| 1 | EPS integrity algorithm EIA3 supported |
| | EPS integrity algorithm EIA4 supported (octet 4, bit 4) |
| 0 | EPS integrity algorithm EIA4 not supported |
| 1 | EPS integrity algorithm EIA4 supported |
| | EPS integrity algorithm EIA5 supported (octet 4, bit 3) |
| 0 | EPS integrity algorithm EIA5 not supported |
| 1 | EPS integrity algorithm EIA5 supported |
| | EPS integrity algorithm EIA6 supported (octet 4, bit 2) |
| 0 | EPS integrity algorithm EIA6 not supported |
| 1 | EPS integrity algorithm EIA6 supported |
| | EPS integrity algorithm EIA7 supported (octet 4, bit 1) |
| 0 | EPS integrity algorithm EIA7 not supported |
| 1 | EPS integrity algorithm EIA7 supported |
| | UMTS encryption algorithms supported (octet 5) |
| | UMTS encryption algorithm UEA0 supported (octet 5, bit 8) |
| 0 | UMTS encryption algorithm UEA0 not supported |
| 1 | UMTS encryption algorithm UEA0 supported |
| | UMTS encryption algorithm UEA1 supported (octet 5, bit 7) |
| 0 | UMTS encryption algorithm UEA1 not supported |
| 1 | UMTS encryption algorithm UEA1 supported |
| | UMTS encryption algorithm UEA2 supported (octet 5, bit 6) |
| 0 | UMTS encryption algorithm UEA2 not supported |
| 1 | UMTS encryption algorithm UEA2 supported |
| | UMTS encryption algorithm UEA3 supported (octet 5, bit 5) |
| 0 | UMTS encryption algorithm UEA3 not supported |
| 1 | UMTS encryption algorithm UEA3 supported |
| | UMTS encryption algorithm UEA4 supported (octet 5, bit 4) |
| 0 | UMTS encryption algorithm UEA4 not supported |
| 1 | UMTS encryption algorithm UEA4 supported |
| | UMTS encryption algorithm UEA5 supported (octet 5, bit 3) |
| 0 | UMTS encryption algorithm UEA5 not supported |
| 1 | UMTS encryption algorithm UEA5 supported |
| | UMTS encryption algorithm UEA6 supported (octet 5, bit 2) |
| 0 | UMTS encryption algorithm UEA6 not supported |
| 1 | UMTS encryption algorithm UEA6 supported |
| | UMTS encryption algorithm UEA7 supported (octet 5, bit 1) |
| 0 | UMTS encryption algorithm UEA7 not supported |
| 1 | UMTS encryption algorithm UEA7 supported |
| | UCS2 support (UCS2) (octet 6, bit 8) |
| | This information field indicates the likely treatment of UCS2 encoded character strings by the UE. |
| 0 | The UE has a preference for the default alphabet (defined in 3GPP TS 23.038 [3]) over UCS2 (see ISO/IEC 10646 [29]). |
| 1 | The UE has no preference between the use of the default alphabet and the use of UCS2. |
| | UMTS integrity algorithms supported (octet 6) |
| | UMTS integrity algorithm UIA1 supported (octet 6, bit 7) |
| 0 | UMTS integrity algorithm UIA1 not supported |
| 1 | UMTS integrity algorithm UIA1 supported |
| | UMTS integrity algorithm UIA2 supported (octet 6, bit 6) |
| 0 | UMTS integrity algorithm UIA2 not supported |
| 1 | UMTS integrity algorithm UIA2 supported |
| | UMTS integrity algorithm UIA3 supported (octet 6, bit 5) |
| 0 | UMTS integrity algorithm UIA3 not supported |
| 1 | UMTS integrity algorithm UIA3 supported |
| | UMTS integrity algorithm UIA4 supported (octet 6, bit 4) |
| 0 | UMTS integrity algorithm UIA4 not supported |
| 1 | UMTS integrity algorithm UIA4 supported |
| | UMTS integrity algorithm UIA5 supported (octet 6, bit 3) |
| 0 | UMTS integrity algorithm UIA5 not supported |
| 1 | UMTS integrity algorithm UIA5 supported |
| | UMTS integrity algorithm UIA6 supported (octet 6, bit 2) |
| 0 | UMTS integrity algorithm UIA6 not supported |
| 1 | UMTS integrity algorithm UIA6 supported |
| | UMTS integrity algorithm UIA7 supported (octet 6, bit 1) |
| 0 | UMTS integrity algorithm UIA7 not supported |
| 1 | UMTS integrity algorithm UIA7 supported |
| | Bits 8 to 5 of octet 7 are spare and shall be coded as zero. |
| | NF capability (octet 7, bit 1) |
| 0 | notification procedure not supported |
| 1 | notification procedure supported |
| | 1xSRVCC capability (octet 7, bit 2) |
| 0 | SRVCC from E-UTRAN to cdma2000 1x CS not supported |
| 1 | SRVCC from E-UTRAN to cdma2000 1x CS supported (see 3GPP TS 23.216 [8]) |
| | Video SRVCC capability(octet 7, bit 3)video SRVCC from E-UTRAN to UTRAN/GERAN not supportedvideo SRVCC from E-UTRAN to UTRAN/GERAN supported |
| | Location services (LCS) notification mechanisms capability (octet 7, bit 3) |
| 0 | LCS notification mechanisms not supported |
| 1 | LCS notification mechanisms supported (see 3GPP TS 24.171 [13C]) |
| | LTE Positioning Protocol (LPP) capability (octet 7, bit 4) |
| 0 | LPP not supported |
| 1 | LPP supported (see 3GPP TS 36.355 [22A]) |

All other bits in octet 8 to 15 are spare and shall be coded as zero, if the respective octet is included in the information element.

Table 14 is a table regarding New information element (IE) for carrying video SRVCC capability.

TABLE 14

```
<video SRVCC capability value part> ::=
<SRVCC to GERAN/UTRAN capability: bit>
Video SRVCC Capability
0 video SRVCC from E-UTRAN to GERAN/UTRAN is not supported
1 video SRVCC from E-UTRAN to GERAN/UTRAN is supported
```

INDUSTRIAL APPLICABILITY

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for managing a plurality of network bearers of a packet data network (PDN) gateway in a wireless communication network, the method comprising:
   receiving an indicator, from a policy and charging rules function (PCRF) entity, associated with an application session corresponding to a video call, the indicator indicating that video single radio voice call continuity (vS-RVCC) is allowed for a flow corresponding to a video component of the video call; and
   transmitting a message including an indicator to be used during handover from a first network to a second network according to the indicator received from the PCRF, to a serving gateway (SGW).

2. The method of claim 1, wherein the indicator is transmitted from the SGW to a mobility management entity (MME).

3. The method of claim 1, wherein the first network is an E-UTRAN communication network and the second network is a UMTS communication network.

4. The method of claim 1, wherein the message is a create bearer request message or an update bearer request message.

5. The method of claim 1, wherein the indicator to be used during handover from the first network to the second network is a vSRVCC indicator.

6. A method for managing a plurality of network bearers of a mobility management entity (MME) in a wireless communication network, the method comprising:
- receiving a first message including a video single radio voice call continuity (vSRVCC) indicator to be used during handover from a first network to a second network from a serving gateway (SGW);
- receiving a handover required message from evolved nodeB (eNB); and
- triggering a procedure of vSRVCC with a mobile switching center (MSC) server when the received handover required message includes vSRVCC related information,
- wherein the vSRVCC indicator is transmitted from a packet data network (PDN) gateway to the SGW based on an indicator indicating that vSRVCC is allowed for a flow corresponding to a video component of a video call, and
- wherein the indicator is transmitted from a policy and charging rules function (PCRF) entity to the PDN gateway.

7. The method of claim 6, wherein the first network is an E-UTRAN communication network and the second network is a UMTS communication network.

8. The method of claim 6, wherein the first message is a create bearer request message or an update bearer request message.

9. The method of claim 6, wherein the first message is transmitted from a packet data network (PDN) Gateway to the SGW.

10. A method for managing a plurality of network bearers of an evolved nodeB (eNB) in a wireless communication network, the method comprising:
- receiving a measurement report from a user equipment (UE);
- determining whether to trigger a video single radio voice call continuity (vSRVCC) handover based on the measurement report; and
- transmitting a handover required message including vSRVCC related information to a mobility management entity (MME) when the SRVCC handover is triggered,
- wherein the vSRVCC related information is used for splitting, by the MME, a voice bearer and a marked PS bearer from an application session corresponding to a video call,
- wherein the voice bearer and the marked PS bearer is split by the MME according to information for each of a plurality of network bearers established based on an initiation or an update of an application session, and
- wherein the information includes at least one of a vSRVCC indicator included in a create bearer request message or a vSRVCC indicator included in an update bearer request message.

11. A packet data network (PDN) gateway for managing a plurality of network bearers in a wireless communication network, the PDN gateway comprising:
- a transceiver configured to receive an indicator, from a policy and charging rules function (PCRF) entity, associated with an application session corresponding to a video call,
- the indicator indicating that video single radio voice call continuity (vSRVCC) is allowed for a flow corresponding to a video component of the video call; and
- a processor configured to:
  - include an indicator to be used during handover from a first network to a second network in a message according to the indicator received from the PCRF, and
  - control sending the message including the indicator to a serving gateway (SGW).

12. The PDN Gateway of claim 11, wherein the indicator is sent from the SGW to a mobility management entity (MME).

13. The PDN Gateway of claim 11, wherein the message is a create bearer request message or an update bearer request message.

14. The PDN Gateway of claim 11, wherein the first network is an E-UTRAN communication network and the second network is a UMTS communication network.

15. The PDN Gateway of claim 11, wherein the indicator to be used during handover from the first network to the second network is a vSRVCC indicator.

16. A mobility management entity (MME) for managing a plurality of network bearers in a wireless communication network, the MME comprising:
- a transceiver configured to receive a first message including a video single radio voice call continuity (vSRVCC) indicator to be used during handover from a first network to a second network from a serving gateway (SGW); and
- a processor configured to receive a handover required message from an evolved nodeB (eNB), to handle a voice bearer and a marked PS bearer when the received handover required massage includes vSRVCC related information, and to control transmitting a second message to a mobile switching center (MSC) server for the voice bearer and the marked PS bearer,
- wherein the vSRVCC indicator is transmitted from a packet data network (PDN) gateway to the SGW based on an indicator indicating that vSRVCC is allowed for a flow corresponding to a video component of a video call, and
- wherein the indicator is transmitted from a policy and charging rules function (PCRF) entity to the PDN gateway.

17. The MME of claim 16, wherein the first network is an E-UTRAN communication network and the second network is a UMTS communication network.

18. The MME of claim 16, wherein the first message is a create bearer request message or an update bearer request message.

19. The MME of claim 16, wherein the first message is transmitted from a packet data network (PDN) Gateway to the SGW.

20. An evolved nodeB (eNB) for managing a plurality of network bearers in a wireless communication network, the eNB comprising:
- a transceiver configured to receive a measurement report from a user equipment (UE); and
- a processor configured to:
  - determine whether to trigger a video single radio voice call continuity (vSRVCC) handover based on the measurement report, and control transmitting a handover required message including vSRVCC related information to a mobility management entity (MME) when the SRVCC handover is triggered,
wherein the vSRVCC related information is used for splitting, by the MME, a voice bearer and an marked PS bearer from an application session corresponding to a video call session,
wherein the voice bearer and the marked PS bearer is split by the MME according to information for each of a plurality of network bearers established based on an initiation or an update of an application session, and
wherein the information includes at least one of a vSRVCC indicator included in a create bearer request message or a vSRVCC indicator included in an update bearer request message.

* * * * *